(12) United States Patent
Chen et al.

(10) Patent No.: US 10,182,053 B2
(45) Date of Patent: Jan. 15, 2019

(54) METHODS AND NODES FOR HANDLING ACCESS TO A SERVICE VIA AN UNTRUSTED NON-3GPP NETWORK

(71) Applicant: TELEFONAKTIEBOLAGET LM ERICSSON (PUBL), Stockholm (SE)

(72) Inventors: Ping Chen, Shanghai (CN); Vicente De Vega De La Red, Madrid (ES); Peter Robert Khello, Norsborg (SE); Cristina Ruiz Balmaseda, Las Matas (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/572,808

(22) PCT Filed: May 11, 2016

(86) PCT No.: PCT/EP2016/060529
§ 371 (c)(1),
(2) Date: Nov. 9, 2017

(87) PCT Pub. No.: WO2016/180865
PCT Pub. Date: Nov. 17, 2016

(65) Prior Publication Data
US 2018/0115549 A1    Apr. 26, 2018

Related U.S. Application Data

(60) Provisional application No. 62/159,651, filed on May 11, 2015.

(51) Int. Cl.
*H04L 29/06* (2006.01)
*H04W 12/08* (2009.01)
(Continued)

(52) U.S. Cl.
CPC ........ *H04L 63/0892* (2013.01); *H04L 63/164* (2013.01); *H04W 8/04* (2013.01);
(Continued)

(58) Field of Classification Search
CPC ............... H04L 63/0892; H04L 63/164; H04L 63/0272; H04W 8/04; H04W 8/06; H04W 12/08; H04W 84/12
(Continued)

(56) References Cited

U.S. PATENT DOCUMENTS 9,179,436 B1 * 11/2015 Dhammawat ......... H04W 4/029
2010/0199332 A1 * 8/2010 Bachmann .......... H04L 63/0428
726/4
(Continued)

FOREIGN PATENT DOCUMENTS

WO      2010086029 A1      8/2010
WO   WO 2010086029 A1 *   8/2010 ......... H04L 63/0428
(Continued)

OTHER PUBLICATIONS

International Search Report and Written Opinion issued in Application No. PCT/EP2016/060529 dated Jul. 7, 2016, 9 pages.
(Continued)

*Primary Examiner* — Yogesh Paliwal
(74) *Attorney, Agent, or Firm* — Rothwell, Figg, Ernst & Manbeck, p.c.

(57) ABSTRACT

Embodiments herein relate to a 3rd Generation Partnership Project, 3GPP, infrastructure node, a method in the 3GPP infrastructure node, 3GPP Access, Authorization, and Accounting, AAA server, a method in the 3GPP AAA server, a Home Subscriber Server, HSS and a method in the HSS. More particularly the embodiments herein relate to handling a UE requesting access to a service via an untrusted non-
(Continued)

3GPP network. According to a first aspect, a method performed by a 3GPP node for handling a UE, requesting access to a service via an untrusted non-3GPP network is provided. The method comprises checking if trusted 3GPP network location information associated with the UE is available to the 3GPP node from a subscriber database or if the available trusted 3GPP network location information is obsolete. If the trusted 3GPP network location information is unavailable or obsolete, the method comprises determining to use untrusted non-3GPP network location information previously received from the 3GPP AAA server or to derive the untrusted non-3GPP network location information at the 3GPP node. Still further, the method comprises determining if the UE is allowed or barred to access the service via the untrusted non-3GPP network based on the received or derived untrusted non-3GPP network location information. The embodiments herein, relate also to corresponding methods performed in an 3GPP Access, Authorization, and Accounting, AAA server, and a Home Subscriber Server, HSS, respectively. Further, the embodiments herein relate also to corresponding 3GPP infrastructure node, 3GPP AAA server, and HSS.

42 Claims, 14 Drawing Sheets

(51) Int. Cl.
*H04W 8/04* (2009.01)
*H04W 84/12* (2009.01)
*H04W 88/06* (2009.01)

(52) U.S. Cl.
CPC ......... *H04W 12/08* (2013.01); *H04L 63/0272* (2013.01); *H04W 84/12* (2013.01); *H04W 88/06* (2013.01)

(58) Field of Classification Search
USPC .......................................................... 726/4
See application file for complete search history.

(56) References Cited

U.S. PATENT DOCUMENTS

| | | | |
|---|---|---|---|
| 2011/0138447 A1* | 6/2011 | Xu ........................ | H04L 63/08 726/4 |
| 2011/0225632 A1* | 9/2011 | Ropolyi ................ | H04W 48/16 726/4 |
| 2014/0157395 A1* | 6/2014 | Li ......................... | H04W 12/02 726/12 |
| 2016/0105780 A1* | 4/2016 | Hooker ................ | H04L 65/1016 370/338 |

FOREIGN PATENT DOCUMENTS

| | | |
|---|---|---|
| WO | 2014005652 A1 | 1/2014 |
| WO | 2014072569 A1 | 5/2014 |

OTHER PUBLICATIONS

3GPP, 3rd Generation Partnership Project; Technical Specification Group Services and System Aspects; 3GPP System Architecture Evolution (SAE); Security aspects of non-3GPP accesses (Release 12), 3GPP TS 33.402 V12.5.0, Dec. 2014, 56 pages.
3GPP, 3rd Generation Partnership Project; Technical Specification Group Core Network and Terminals; Evolved Packet System (EPS); 3GPP EPS AAA interfaces (Release 12), 3GPP TS 29.273 V12.7.0, Mar. 2015, 162 pages.
3GPP, 3rd Generation Partnership Project; Technical Specification Group Core Network and Terminals; Sh Interface based on the Diameter protocol; Protocol details (Release 14), 3GPP TS 29.329 V14.0.0, Sep. 2016, 23 pages.
3GPP, 3rd Generation Partnership Project; Technical Specification Group Services and System Aspects; Architecture enhancements for non-3GPP accesses (Release 13), 3GPP TS 23.402 V13.7.0, Sep. 2016, 299 pages.
3GPP, 3rd Generation Partnership Project; Technical Specification Group Core Network and Terminals; Evolved Packet System (EPS); 3GPP EPS AAA interfaces (Release 14), 3GPP TS 29.273 V14.0.0, Sep. 2016, 181 pages.
Calhoun P. et al.: "Diameter Base Protocol", Network Working Group; Request for Comments: 3588; Category: Standard Track; Copyright (C) The Internet Society (2003); 131 pages.

\* cited by examiner

METHODS AND NODES FOR HANDLING ACCESS TO A SERVICE VIA AN UNTRUSTED NON-3GPP NETWORK

CROSS REFERENCE TO RELATED APPLICATION(S)

This application is a 35 U.S.C. § 371 National Stage of International Patent Application No. PCT/EP2016/060529, filed May 11, 2016, designating the United States and claiming priority to U.S. provisional application No. 62/159,651, filed on May 11, 2015. The above identified applications are hereby incorporated by reference.

TECHNICAL FIELD

Embodiments herein relate to a 3GPP node, a method in the 3GPP node, 3GPP AAA server, a method in the 3GPP AAA server, a HSS and a method in the HSS. More particularly the embodiments herein relate to handling a UE requesting access to a service via an untrusted non-3GPP network.

BACKGROUND

3GPP has specified a set of architecture enhancements for providing Internet Protocol (IP) connectivity using non-3GPP accesses (e.g. WiFi), to the evolved 3GPP Packet Switched (PS) domain. Both roaming and non-roaming scenarios are covered and all related procedures including mobility between 3GPP and non 3GPP accesses, policy control and charging, and authentication, related to the usage of non-3GPP.

The evolved packet system, EPS, supports the use of non-3GPP IP access networks to access the EPC. The Mobility mechanisms supported between 3GPP and non-3GPP accesses within an operator and its roaming partner's network would depend upon operator choice.

FIG. 1 depicts on high level the 3GPP reference architecture for a non-roaming scenario. The communications system 100 illustrated in FIG. 1 comprises a UE 101 which access's a 3GPP core network 102. The UE 101 may access a 3GPP access network 103 via a non-3GPP network such as at least one of e.g. an untrusted non-3GPP IP access network 105 and a trusted non-3GPP IP access network 108.

Trusted and Untrusted Non-3GPP Access Networks 105, 108 are IP access networks that use access technology whose specification is out of the scope of the 3GPP. Whether a Non-3GPP IP 105, 108 access network is Trusted or Untrusted is not a characteristic of the access network. In non-roaming scenario it is the HPLMN's operator decision if a Non-3GPP IP access network is used as Trusted or Untrusted Non-3GPP Access Network.

In roaming scenario, the HSS/3GPP AAA Server in HPLMN 100*h* makes the final decision of whether a Non-3GPP IP access network is used as Trusted or Untrusted non-3GPP Access Network. The HSS/3GPP AAA Server may take the VPLMN's policy and capability returned from the 3GPP AAA Proxy or roaming agreement into account.

The untrusted non-3GPP IP access network 105 may also be referred to as an untrusted non-3GPP access network, an untrusted non-3GPP network, an untrusted non-3GPP access, an untrusted non-3GPP IP access, an untrusted non-3GPP domain or an untrusted WiFi domain. The trusted non-3GPP IP access network 108 may also be referred to as a trusted non-3GPP access network, a trusted non-3GPP network, a trusted non-3GPP access, a trusted non-3GPP IP access, a trusted non-3GPP domain or a trusted WiFi domain.

The 3GPP core network may be e.g. a WCDMA (Wideband Code Division Multiple Access) network, a GSM (Global System for Mobile Communications) network or a Long Term Evolution (LTE) network. The 3GPP core network 102 may also be an Evolved Packet Core (EPC) network.

The UE 101 may be a device by which a subscriber may access services offered by an operator's network and services outside operator's network to which the operator's radio access network and core network provide access, e.g. access to the Internet. The UE 101 may be any device, mobile or stationary, enabled to communicate in the communications network, for instance but not limited to e.g. user equipment, mobile phone, smart phone, sensors, meters, vehicles, household appliances, medical appliances, media players, cameras, Machine to Machine (M2M) device, Device to Device (D2D) device, Internet of Things (IoT) device, SIM device, or any type of consumer electronic, for instance but not limited to television, radio, lighting arrangements, tablet computer, laptop or Personal Computer (PC). The UE 101 may be portable, pocket storable, hand held, computer comprised, or vehicle mounted devices, enabled to communicate voice and/or data, via the radio access network, with another entity, such as another UE or a server.

The 3GPP core network 102 comprises 3GPP infrastructure nodes or core network nodes. Examples of core network nodes are the HSS 110, 3GPP AAA server 113, PCRF 115, ePDG 117, gateways such as e.g. SGW 118 and PGW 120.

The UE 101 may be provided access to EPC service provided by the 3GPP network 103 via e.g. the untrusted non-3GPP IP access network 105. The UE's operator provides operator IP services 125 to the UE 101.

The HSS 110 is an example of a subscriber database which comprises subscriber related data and information, i.e. related to the subscriber associated with the UE 101. Another example of a subscriber database may be a HLR 130. In some embodiments, the HSS 110 is referred to as a HSS server. The HLR 130 and the reference number 130 are not illustrated in FIG. 1, but in other figures.

The ePDG 117 is an example of a non-3GPP access gateway which acts as a gateway between the non-3GPP access networks and the 3GPP core network 102. Other examples of such non-3GPP access gateways may be a MAG or a TWAG.

In some embodiments, the 3GPP AAA server 113 comprises functionalities which enable it to also act as an AAA proxy. The 3GPP AAA server 113 may also be referred to as an AAA server.

The HSS 110 may be adapted to be connected to the 3GPP network 103 e.g. via the S6a interface. The HSS 110 may be further adapted to be connected to the 3GPP AAA server 113 e.g. via a SWx interface.

The PCRF 115 is a node which is adapted to be connected to the SGW 118 e.g. via a Gxc interface and adapted to be connected to the Operator IP services 125 e.g. via an Rx interface. The PCRF 115 is adapted to be connected to the ePDG 117 e.g. via a Gxb interface and to the PGW 120 e.g. via a Gx interface. The PCRF may be adapted to be connected to the trusted non-3GPP IP access network 108 e.g. via a Gxa interface.

The SGW 118 may be adapted to be connected go the PGW 120 e.g. via a S5 interface.

The PGW 120 may be adapted to be connected to the trusted non-3GPP IP access network 108 e.g. via an S2a interface and to the ePDG 117 e.g. via an S2b interface. The PGW 120 may be adapted to be connected to the 3GPP AAA server 113 e.g. via an S6b interface and to the Operator IP Services 125 e.g. via a SGi interface.

The 3GPP AAA server 113 may be adapted to be connected to the trusted non-3GPP IP access network 108 e.g. via a STa interface and to the 3PDG via a SWm interface. The 3GPP AAA server 113 may be adapted to be connected to the untrusted non-3GPP IP access network 105 e.g. via a SWa interface.

The ePDG 117 may be adapted to be connected to the untrusted non-3GPP IP access 105 e.g. via a SWn interface.

The UE 101 may be adapted to be connected to the ePDG 117 (e.g. via the untrusted non-3GPP IP access network 105) e.g. using a SWu interface.

WiFi is an example of a non-3GPP technology and is a wireless networking technology that uses radio waves to provide wireless high-speed Internet and network connections. WiFi access subscription management related functionalities e.g. authentication, authorization are provided with support from both the HSS 110 and the 3GPP AAA server 113.

The 3GPP integrated WiFi trusted access authorization is done on per WiFi access network i.e. the UE's 101 access to the core network 102 and non-seamless WiFi off-load services are allowed/barred on per WiFi access network. The WiFi access network may be identified by the SSID and optionally the HESSID.

The 3GPP integrated WiFi untrusted access authorization, though not specified by 3GPP, can be done on per WiFi access network i.e. the Visited Network Identifier.

The 3GPP integrated WiFi access authorization data is stored in the HSS server 110 and is downloaded to the 3GPP AAA server 113 for further enforcement at the access authorization.

For trusted WiFi access networks 108, the visited network is known with support from the visited network 3GPP AAA 113 by means of the attribute "Visited-Network-Identifier" over the SWd interface.

For untrusted WiFi access networks 105, e.g. public or residential WiFi networks, when the UE 101 connects with the ePDG 117, the visited network is not known, i.e. it is not known whether the user is in its home domain or outbound roaming. Therefore access authorization on roaming conditions could not be provided. FIG. 2 depicts an overall topology of the untrusted WiFi access network roaming use case. In FIG. 2, the UE 101 is illustrated to have an IPSec tunnel to the ePDG 117 via the public WiFi. The vertical solid lines illustrate the border between the visiting PLMN and the home PLMN. For a trusted environment where the location of the UE 101 is known, the visiting AAA address is used (SWd): MCC-MNC-NodeID. For an untrusted environment where the location is unknown, an originating IP-address (Can be spoofed) or an appropriate solution deriving location from home network is used. Identification of WiFi is expressed by dummy "MNC"=generic WiFi access

SUMMARY

An objective of embodiments herein is therefore to obviate at least one of the above disadvantages and to provide improved IP connectivity for a UE using non-3GPP access.

Thanks to at least one of the last known serving node address from the 3GPP network (e.g. VLR, MME, SGSN), the 3GPP AAA user based visited network information, and the user IP address mapping to a Country Code using GeoIP Database, roaming restriction for voice over WiFi can be applied in order to provide improved IP connectivity for the UE using non-3GPP access.

Embodiments herein afford many advantages, of which a non-exhaustive list of examples follows:

The integrated WiFi access authorization proposed with the embodiments herein provides an advantage of allowing the operator to define the access authorization under roaming conditions, and to help the customers restrict access to Voice over WiFi service when user is outbound roaming.

The embodiments herein do not require any update of the existing network setting or to define/create/maintain new WiFi access networks. Instead, the embodiments herein involve updating the concerned subscription access authorization profiles in either the HSS 110 or the 3GPP AAA server 113, depending on the selected embodiment.

According to a first aspect, a method performed by a 3GPP node for handling a UE, requesting access to a service via an untrusted non-3GPP network is provided. The method comprises checking if trusted 3GPP network location information associated with the UE is available to the 3GPP node from a subscriber database or if the available trusted 3GPP network location information is obsolete. If the trusted 3GPP network location information is unavailable or obsolete, the method comprises determining to use untrusted non-3GPP network location information previously received from the 3GPP AAA server or to derive the untrusted non-3GPP network location information at the 3GPP node. Still further, the method comprises determining if the UE is allowed or barred to access the service via the untrusted non-3GPP network based on the received or derived untrusted non-3GPP network location information.

The service may be an EPC service; such as e.g. voice over WiFi, data, IP traffic etc.

According to a second aspect, a method performed by an AAA server for handling a UE requests access to a service via an untrusted non-3GPP network, is provided. The method comprises checking if trusted 3GPP network location information associated with the UE is available to the AAA server from a subscriber database or if the available trusted 3GPP location network information is obsolete. If the trusted 3GPP network location information is unavailable or obsolete, the method comprises determining to derive the untrusted non-3GPP network location information at the 3GPP node; and deriving the untrusted non-3GPP network location information associated with the UE based on information from another database. Still further, the method comprises determining if the UE is allowed or barred to access the service via the untrusted non-3GPP network based on the derived untrusted non-3GPP network location information.

The another or second database may be a geographical database, e.g. GeoIP database, which is associated with the AAA server.

The trusted 3GPP network location information may comprise an address of a serving node, e.g. VLR, SGSN, MME in the visited 3GPP network, which serves the UE in the visited 3GPP network.

The trusted 3GPP network location information may comprise geographical area information, e.g. country code.

According to a third aspect, a method performed by a HSS for handling a UE, requesting access to a service via an untrusted non-3GPP network is provided. The method comprises checking if trusted 3GPP network location information associated with the UE is available to the HSS, or if the available trusted 3GPP network location information is obsolete. If the trusted 3GPP network location information is unavailable or obsolete, the method comprises determining to use untrusted non-3GPP network location information previously received from the 3GPP AAA server. Still further, the method comprises determining if the UE is allowed or barred to access the service via the untrusted non-3GPP network based on the received untrusted non-3GPP network location information.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

There has been a great interest in using non-3GPP technologies such as e.g. WiFi to offload traffic from mobile networks. Early deployments consisted of building a parallel WiFi offload network that takes the traffic directly to internet. Now the industry is moving its focus towards integrating WiFi RANs into the mobile packet core network and creating new business cases, e.g. voice call over WiFi. The embodiments herein address the roaming restriction for 3GPP services provided by the 3GPP network via a non-3GPP network (e.g. Voice over WiFi (VoWiFi)) based on the HSS 110 and the 3GPP AAA server 113.

Figure 3:
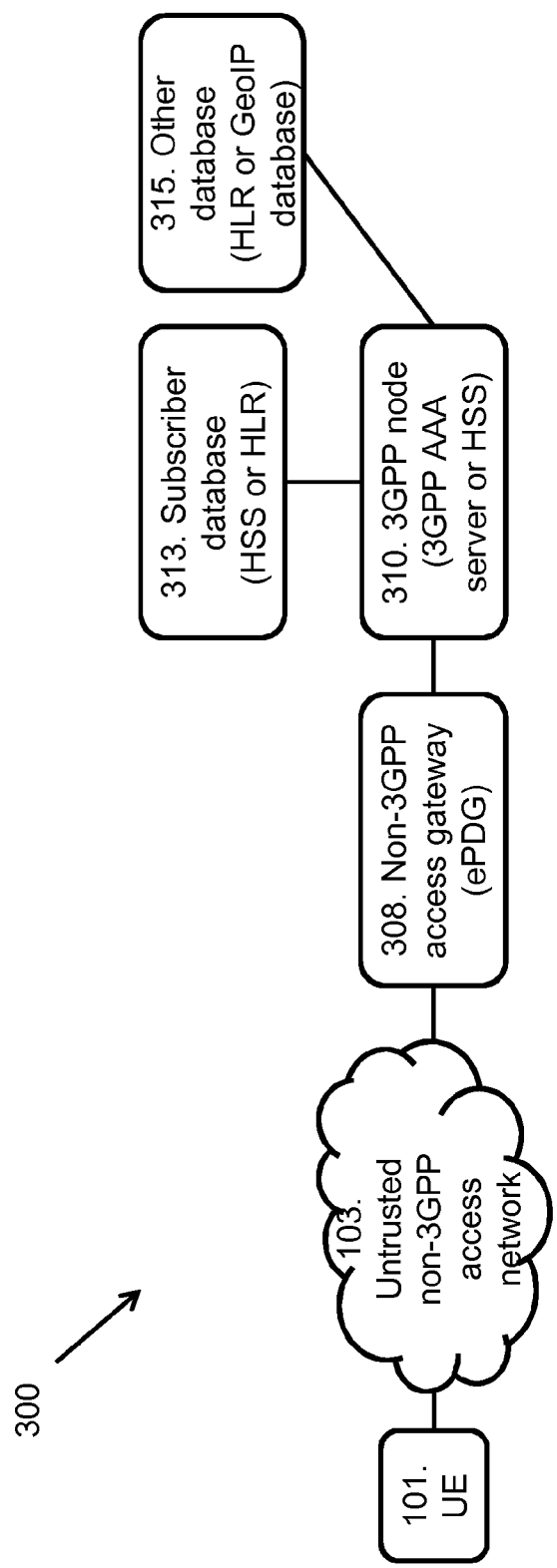
FIG. 3 is a schematic block diagram illustrating embodiments of a communications system.

FIG. 3 depicts a communications system 300 in which embodiments herein may be implemented. The communications system 300 comprises the UE 101 which may access a service (e.g. Voice over WiFi) via an untrusted non-3GPP access network 103. A non-3GPP access gateway 308 is a gateway node between the untrusted non-3GPP access network 103 and the 3GPP network (e.g. the EPC network). The non-3GPP access gateway 308 is connected to a 3GPP node 310. Herein, 3GPP node is also called a 3GPP infrastructure node and the terms are used interchangeably. The 3GPP node 310 may be e.g. a 3GPP AAA server 113 or a HSS 110. The 3GPP node 310 may be connected to a subscriber database 313. The subscriber database 313 may be a HSS 110 or a HLR 130. The 3GPP node 310 may also be connected to another database 315. This other database 315 may be e.g. a HLR or a GeoIP database.

The UE 101 may be a device by which a subscriber may access services offered by an operator's network and services outside operator's network to which the operators radio access network and core network provide access, e.g. access to the Internet. The UE 101 may be any device, mobile or stationary, enabled to communicate in the communications network, for instance but not limited to e.g. user equipment, mobile phone, smart phone, sensors, meters, vehicles, household appliances, medical appliances, media players, cameras, Machine to Machine (M2M) device, Device to Device (D2D) device, Internet of Things (IoT) device or any type of consumer electronic, for instance but not limited to television, radio, lighting arrangements, tablet computer, laptop or Personal Computer (PC). The UE 101 may be portable, pocket storable, hand held, computer comprised, or vehicle mounted devices, enabled to communicate voice and/or data, via the radio access network, with another entity, such as another UE or a server.

Figure 3A:
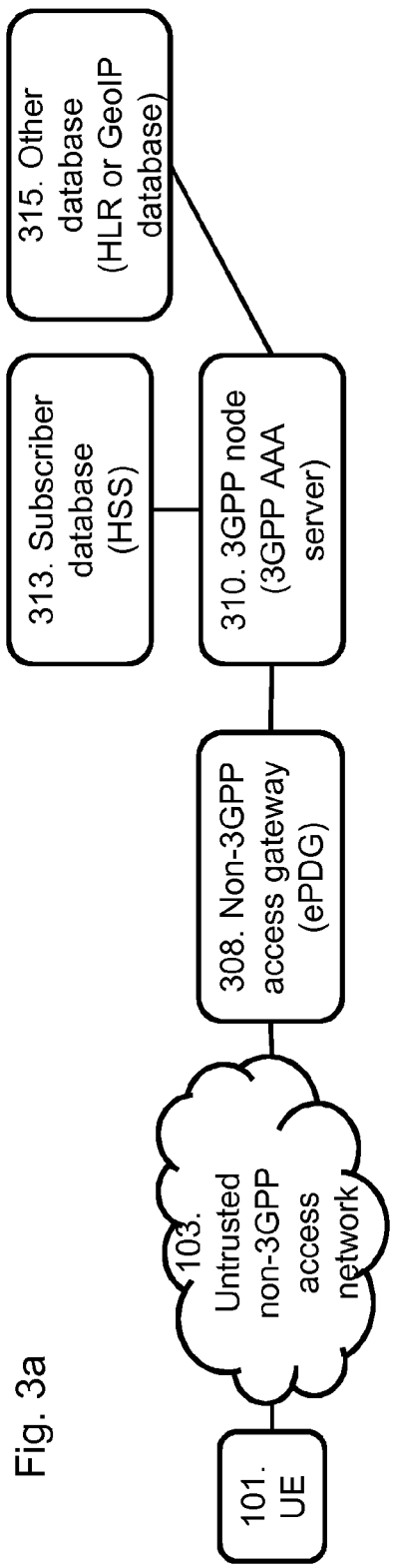
FIG. 3a is a schematic block diagram illustrating embodiments of a communications system where the 3GPP node is a 3GPP AAA server.
Figure 3B:
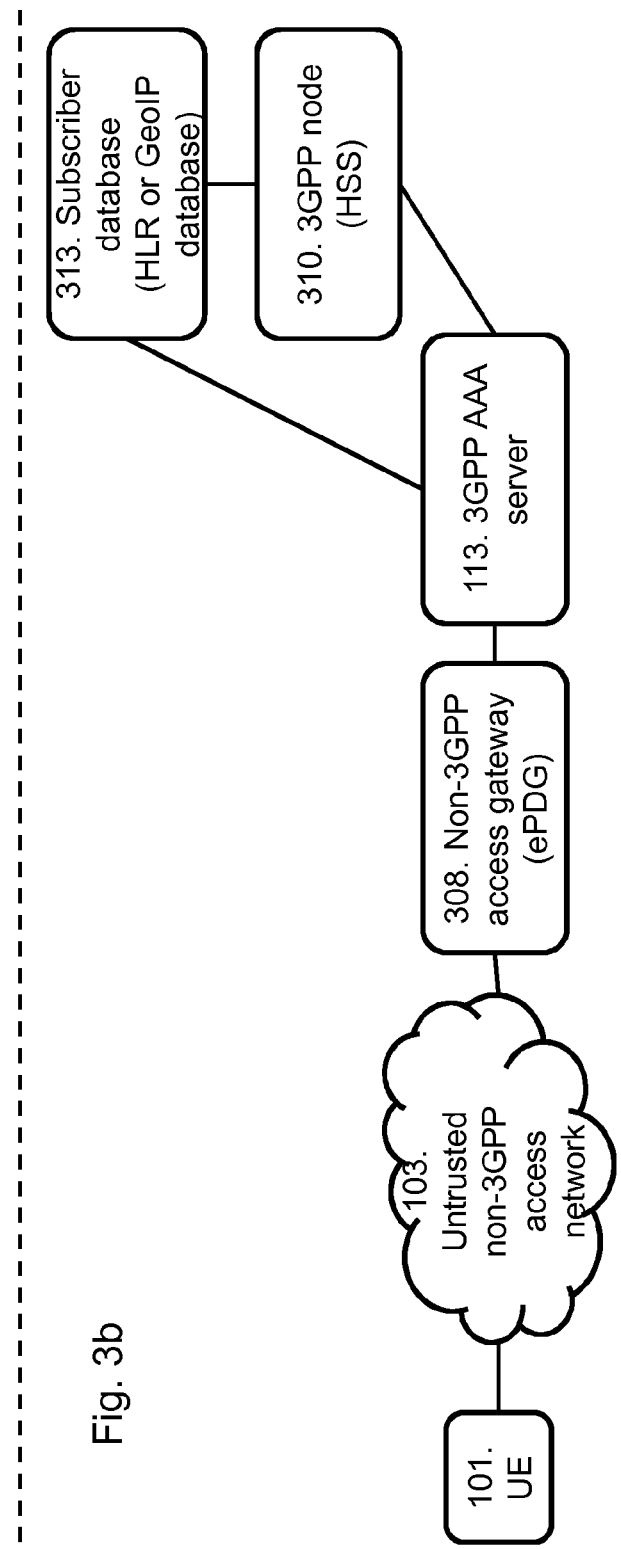
FIG. 3b is a schematic block diagram illustrating embodiment of a communications system where the 3GPP node is a HSS.

FIG. 3a and FIG. 3b are figures which illustrate example embodiments of the communications system 300 in FIG. 3. FIG. 3a illustrates an embodiment where the 3GPP node 310 is a 3GPP AAA server 113 and FIG. 3b illustrates an embodiment where the 3GPP node 310 is a HSS 110.

In FIG. 3a, which may be described as illustrating an AAA based embodiment, the UE 101 may access the untrusted non-3GPP access network 103. The non-3GPP access gateway 308 between the untrusted non-3GPP access network 103 and the 3GPP node 103 is represented by an ePDG in FIG. 3a. The 3GPP node 310 which is represented by a 3GPP AAA server 113 is connected to the subscriber database 313. The subscriber database 313 is represented by the HSS in FIG. 3a. The 3GPP node 310 may also be connected to another database 315. The other database 315 may be represented by a HLR or a GeoIP database in FIG. 3a.

In FIG. 3b, which may be described as illustrating an HSS based embodiment, the UE 101 may access the untrusted non-3GPP access network 103. The non-3GPP access gateway node 308 is represented by the ePDG is the gateway between the untrusted non-3GPP access network 103 and the 3GPP AAA server 113. The 3GPP node 310 is represented by a HSS 110 in FIG. 3b and is connected to the 3GPP AAA server 113 and to the subscriber database 313. The subscriber database 313 is represented by the HLR or a GeoIP database in FIG. 3b. The 3GPP node 310 may also be connected to the subscriber database 113.

It should be noted that the communication links in the communications system 300 in FIGS. 3, 3a and 3b may be of any suitable kind including either a wired or wireless link. The link may use any suitable protocol depending on type and level of layer (e.g. as indicated by the OSI model) as understood by the person skilled in the art.

Figure 1:
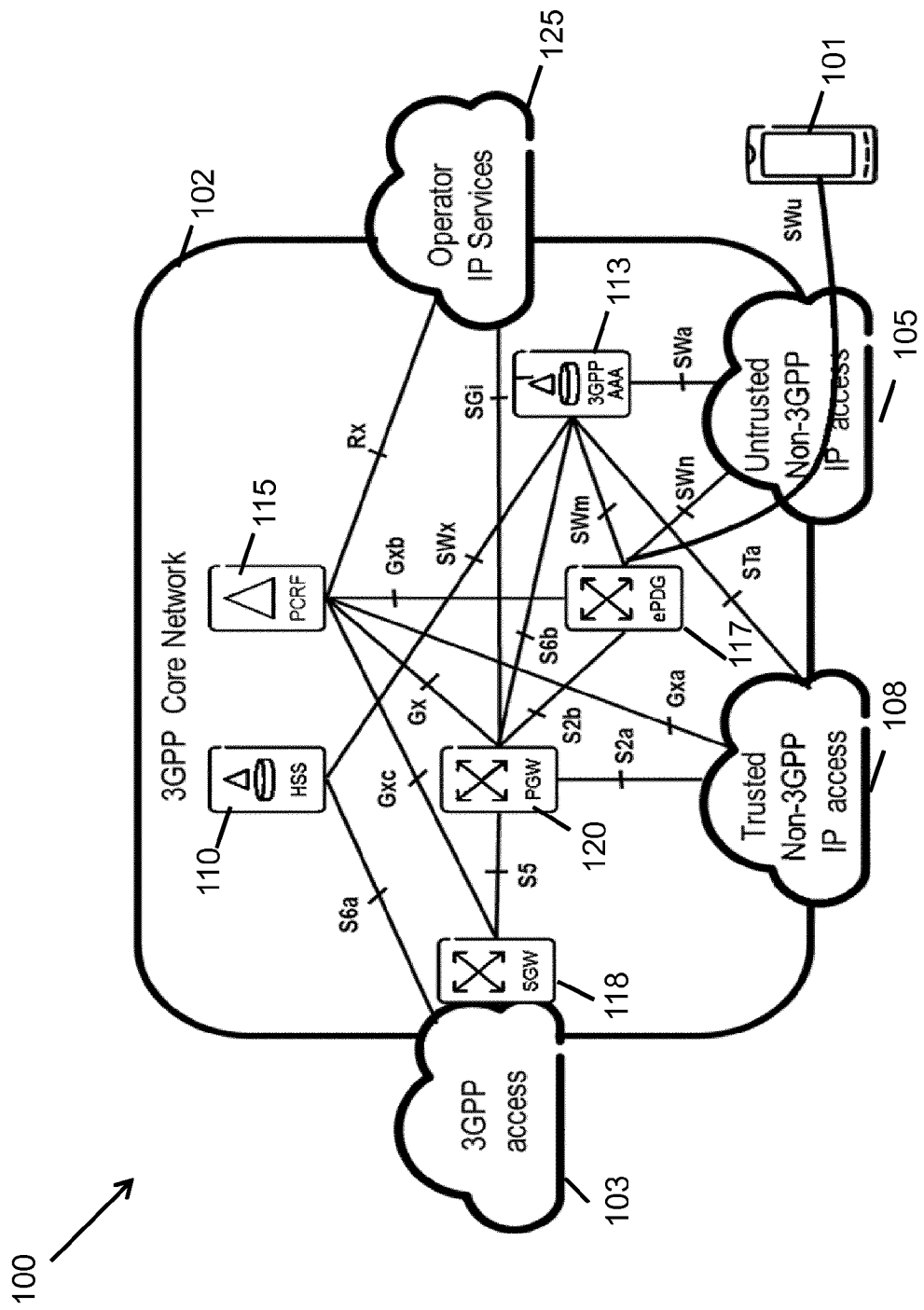
FIG. 1 is a schematic block diagram illustrating embodiments of a communications system.
Figure 2:
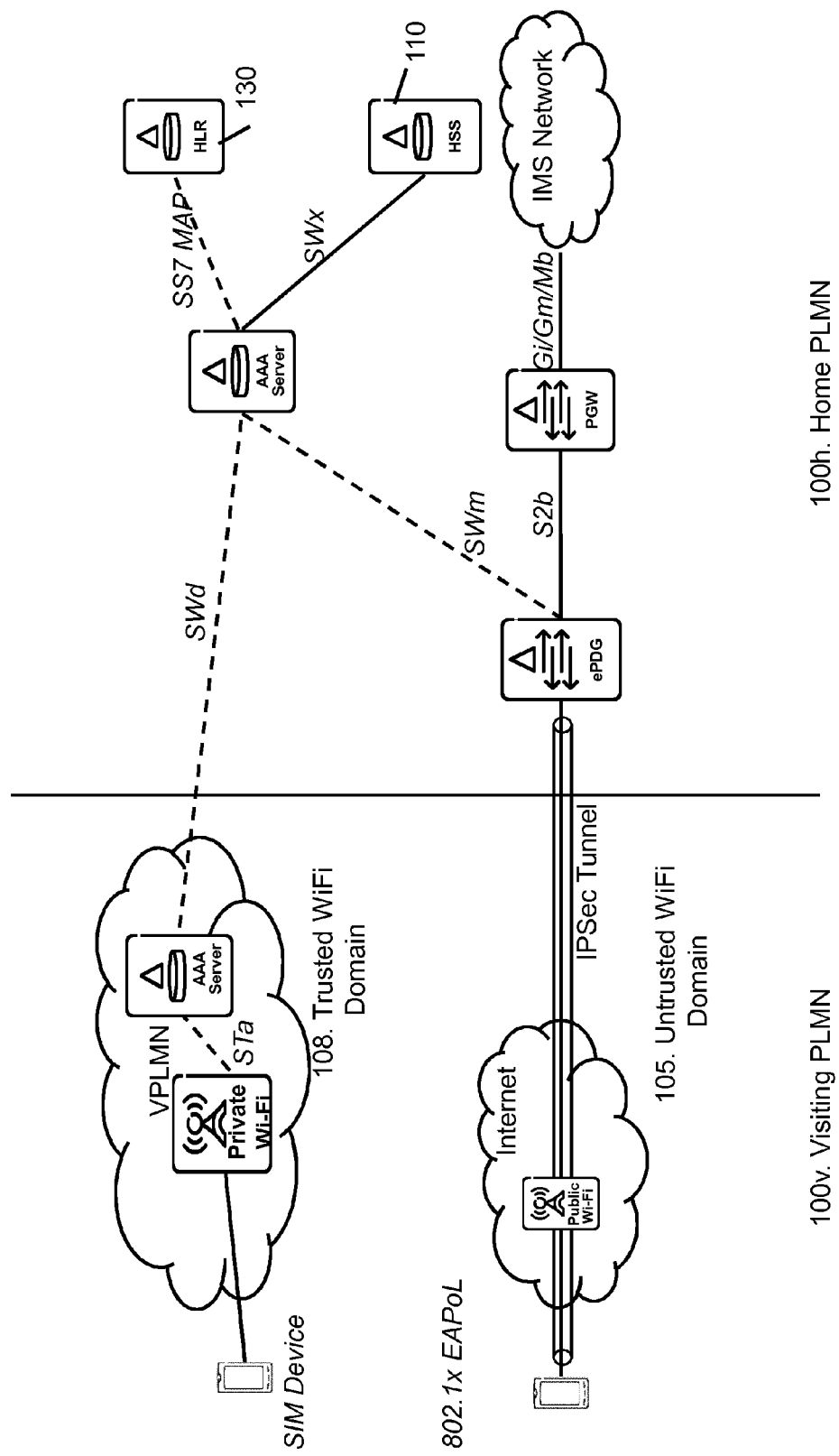
FIG. 2 is a schematic block diagram illustrating embodiments of a roaming scenario.
Figure 4:
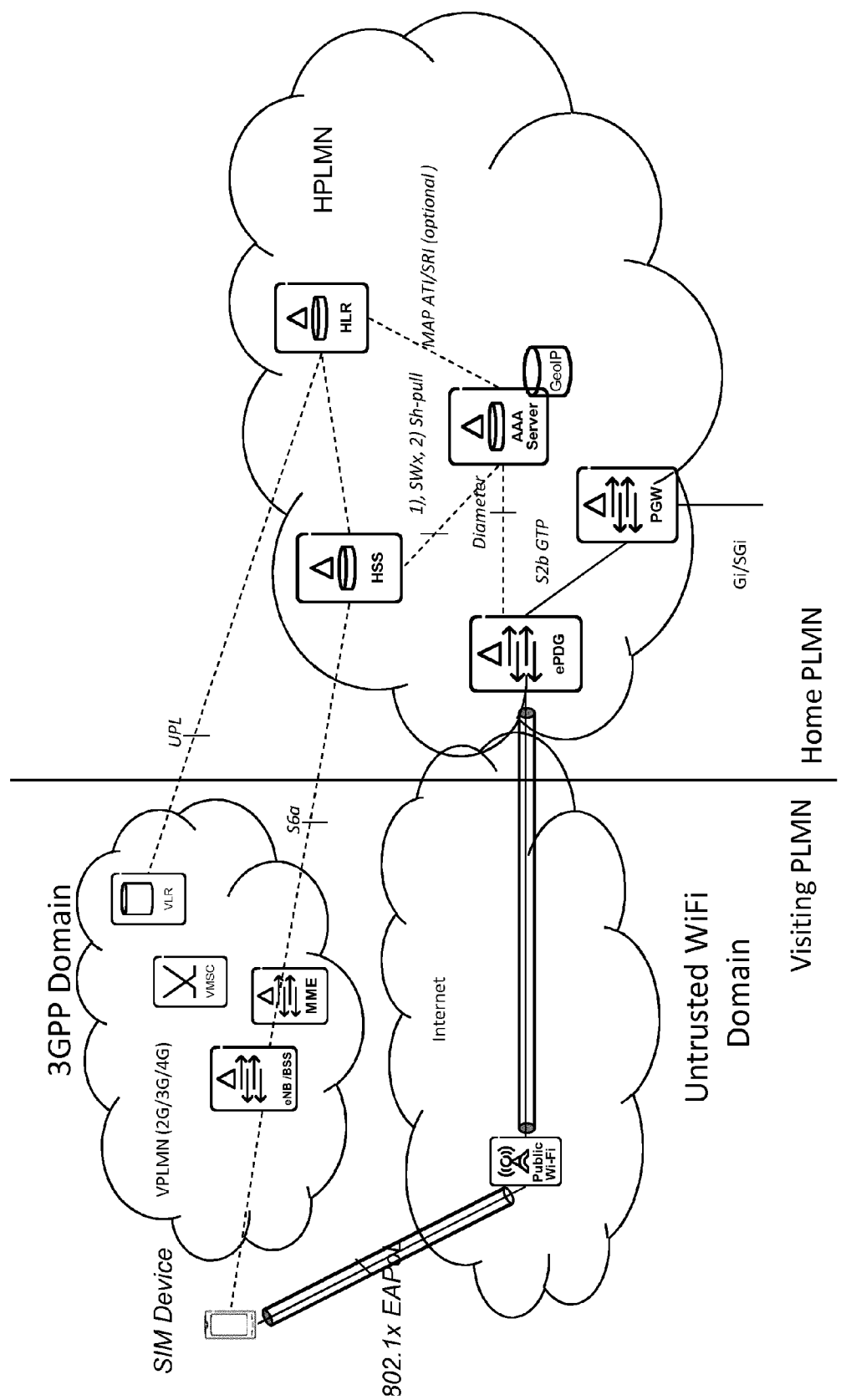
FIG. 4 is a schematic block diagram illustrating embodiments of a roaming scenario involving the 3GPP AAA server.
Figure 5:
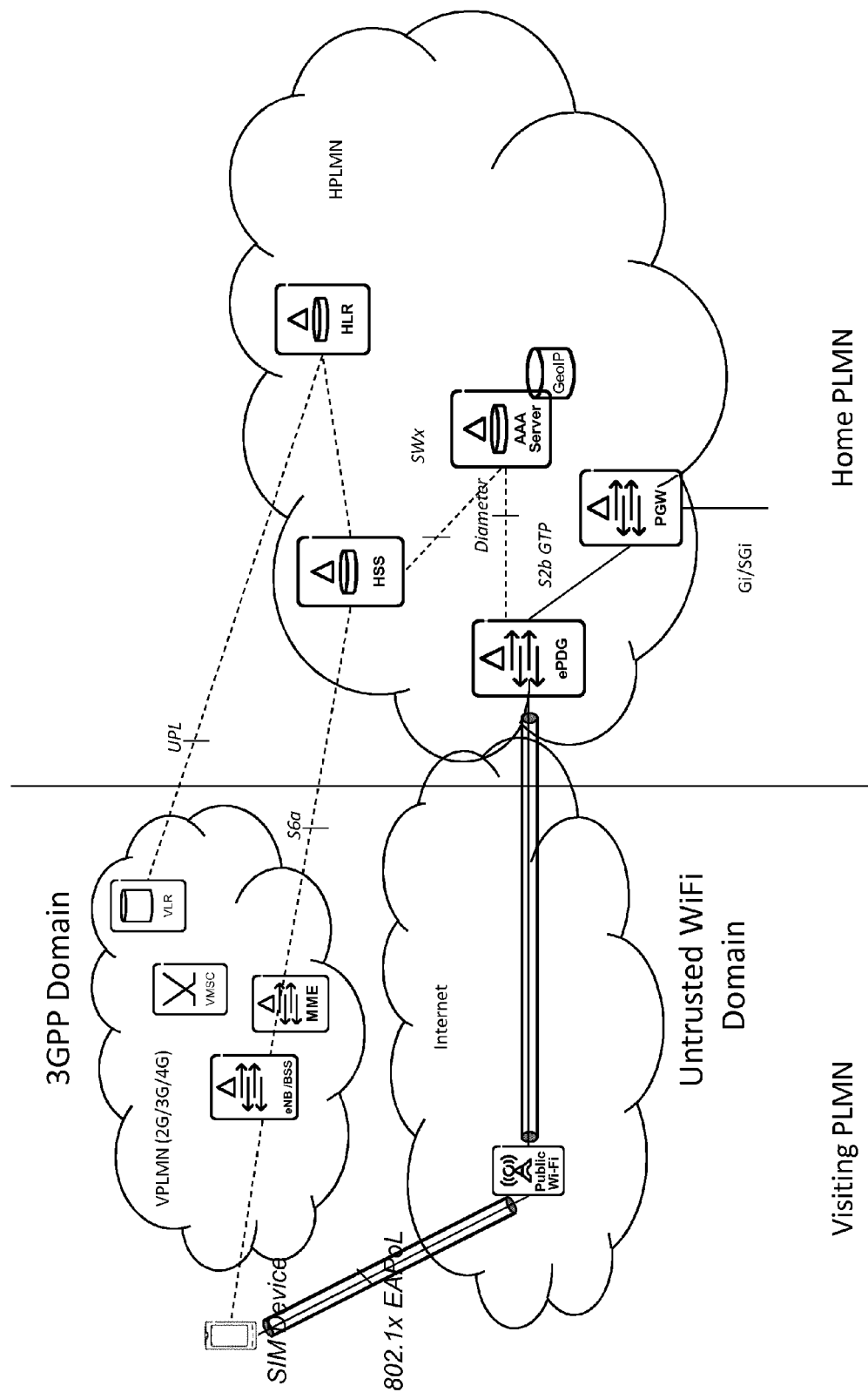
FIG. 5 is a schematic block diagram illustrating embodiments of a roaming scenario involving the HSS.

FIGS. 3, 3a and 3b are general figures. A detailed embodiment of the communication system 300 in FIGS. 3, 3a and 3b is illustrated in FIGS. 1, 4 and 5.

One example embodiment will now be described with reference to FIG. 4. The example embodiment in FIG. 4 illustrates a 3GPP AAA based method. In more detail, FIG. 4 depicts an overall topology of the untrusted WiFi access network roaming solution based on the 3GPP AAA method.

During initial attach or handover attach a UE needs to discover the trust relationship (whether it is a Trusted or Untrusted Non-3GPP Access Network) of the non-3GPP access network in order to know which non-3GPP IP access procedure to initiate.

The 3GPP AAA server 113 on receipt of the access authentication request will initiate the registration procedure and download the concerned subscription data from the HSS 110 via the SWx interface and initiates the access authorization procedure.

The 3GPP AAA access authorization procedure will check whether the user is allowed/barred to get access to the visited network thru an untrusted WiFi network.

The following is a description of the 3GPP AAA procedure in FIG. 4 for how to get the user visited network information:

The HSS 110 provides the available user serving node information in the 3GPP domain via SWx interface to the 3GPP AAA server 113. To this end, a SWx extension may be required.

If the concerned HSS 110 is not able to provide information indicating the user serving node in the 3GPP domain thru the SWx interface to the 3GPP AAA server 113, the 3GPP AAA server 113 may request the HSS 110 for the user serving node in the 3GPP CS/PS/EPS domain via the Sh interface. Alternatively, the 3GPP AAA server 113 may also directly query the HLR 130 via the MAP ATI interface or the MAP SRI interface for the 2G/3G CS/PS location information.

When the 3GPP AAA server 113 has no available user serving node information available from the 3GPP domain, or when the available information is obsolete, the 3GPP AAA server 113 may derive the user based location information itself.

The user based location information may be e.g. the Country-Code, and the user based location information may be derived by mapping the UE IP address to the Country Code (CC) via a GeoIP Database. The GeoIP Database is a database which may be associated with the 3GPP AAA server 113.

The 3GPP AAA access authentication procedure may check whether the UE 101 is allowed to get access to the concerned visited network and the requested EPC service. If the UE 101 is allowed, the further access authorization steps may be done. If the UE 101 is not allowed, i.e. it is barred, the UE 101 would not be allowed to do roaming.

Concerning the subscription access authentication data handling, the user roaming restriction data may be stored at the 3GPP AAA server 113.

One example embodiment will now be described with reference to FIG. 5. The example embodiment in FIG. 5 illustrates a HSS based method. In more detail, FIG. 5 depicts an overall topology of the untrusted WiFi access network roaming solution based on the HSS method.

On receipt of the access authentication request, the 3GPP AAA server 113 may initiate the registration procedure and download the concerned subscription data from the HSS 110 e.g. via the SWx interface.

The HSS access authorization procedure may check whether the UE 101 is allowed/barred to get access to the visited 3GPP network thru an untrusted WiFi network 105.

The following is a description of the HSS procedure in FIG. 5 for how to get the user visited network information:

The HSS 110 checks the available user serving node information in the 3GPP domain. For scenarios in which the 2G/3G user serving node data is stored in HLR 130, the HSS 110 may request the HLR 130 to provide such information.

If the HSS 110 is not able to obtain the user serving node in the 3GPP domain, or if the information is obsolete, the HSS 110 may use the 3GPP AAA provided user visited network information over the SWx interface in the Visited-Network-Identify parameter, i.e. the Country Code, based on the user IP address mapped to the Country Code using e.g. a GeoIP Database.

The HSS access authentication procedure may check whether the UE 101 is allowed to get access to the concerned visited network. If so, the further access authorization steps will be done otherwise the user would not be allowed to do roaming, and the HSS 110 will notify it to the 3GPP AAA server 113.

Concerning the subscription access authentication data handling, the user roaming restriction data may be stored at the HSS 110.

Figure 6:
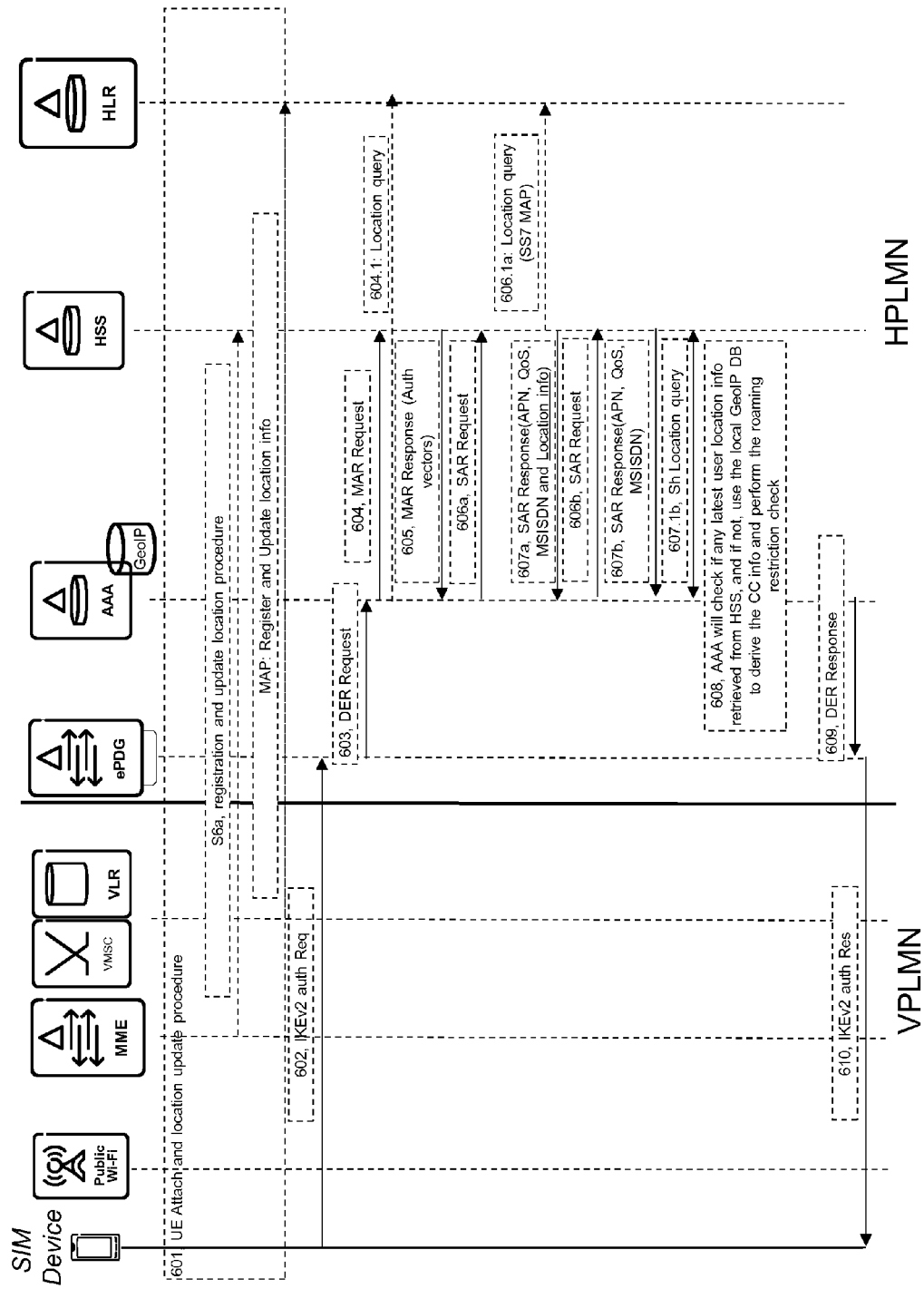
FIG. 6 is a signaling diagram illustrating embodiments of 3GPP AAA server based method sequence for a roaming restriction for WiFi.

FIG. 6 is a signaling diagram illustrating embodiments of a 3GPP AAA based method sequence. The solid vertical line in FIG. 6 illustrates the border between the VPLMN 100v and the HPLMN 100h. In FIG. 6, the UE 101 visits a visited PLMN. The method in FIG. 6 comprises at least some of the following steps, which steps may be performed in any suitable order than described below:

Step 601

The user switches on the UE 101 and may initiate the attach procedure, and location update procedure towards the HLR 130 and the HSS 110 in the home network. This may involve the MME 135 in the VPLMN 100v performing an S6a-registration and update location procedure towards the HSS 110 in the HPLMN 100h and the VMSC/VLR in the VPLMN 100v sending MAP-register and update location information to the HLR 130 in the HPLMN 100h.

Step 602

The user turns on the VoWiFi service in the UE 101, and then the UE 101 may start Internet Key Exchange version 2 (IKEv2) negotiation with the ePDG 117 in the HPLMN 100h to setup an IPSec tunnel between the UE 101 and the ePDG 117 node. The IKEv2 negotiation involves the UE 101 sending an IKEv2 authorization request to the ePDG 117 in the HPLMN 100h. IKE is a protocol used to set up a security association (SA) in the IPsec protocol suite.

Step 603

The ePDG 117 in the HPLMN 100h may send a Diameter Extensible authentication protocol Request (DER) to 3GPP AAA server 113 in the HPLMN 100h for user authentication and authorization over the SWm interface. The DER request comprises the UE IPSec outer IP Address. The UE IPSec outer IP address may be placed in a UE-Local-IP-Address attribute in the DER request.

Step 604

The 3PPP AAA server 113 in the HPLMN 100h may send a MAR Request message to the HSS 110 in the HPLMN 100h. The MAR request is a request for authentication information e.g. in the form of vectors.

Step 604.1

In some embodiments, the 3GPP AAA server 113 may alternatively query the HLR 130 for User location information (before the query to HSS 110 in step 604).

Step 605

The HSS 110 sends the requested authentication information to the 3GPP AAA server 113, e.g. using MAR.

One of two alternative embodiments within FIG. 6 will now be described. Steps 606a-607a is an alternative to steps 606b-607.1b.

Step 606a

In step 606a, the 3GPP AAA server sends a SAR Request message to the HSS 110. The SAR Request message comprises a request for the location information.

Step 606.1a

In case the 2G/3G serving node information is stored in the HLR 130, the HSS 110 sends a location query to the HLR 130. The network-based-location may comprise the serving node address e.g. VLR, SGSN, MME and/or Country-Code.

Step 607a

The user serving node information is obtained from the HSS 110 by extending the existing SAR response message with new attributes (e.g. network-based-location). In step 607a, the HSS 110 sends a SAR Response message to the 3GPP AAA server. The SAR response message comprises information indicating e.g. the APN, QoS, MSISDN. In addition, location info is comprised in the SAR response message. The information can be already stored in the HSS 110 or obtained from the HLR 130 as described in step 606.1a. The network-based-location may comprise the serving node address e.g. VLR, SGSN, MME and/or Country-Code.

The second alternative embodiments within FIG. 6 will now be described. Steps 606b-607.1b is an alternative to steps 606a-607a.

Step 606b

This step is similar to step 606a. In step 606b, the 3GPP AAA server sends a SAR Request message to the HSS 110. The SAR Request message comprises a request for the location information.

Step 607b

The HSS 110 sends a SAR Response message comprising e.g. the APN, QoS, MSISDN to the 3GPP AAA server 113. The SAR response message in step 607b is different from the one in step 607a in that it does not comprise the location information.

Step 607.1b

The 3GPP AAA server 113 may use the Sh interface to query the network based location information from the HSS 110 after the standard UE registration procedure by means of SAR messages in steps 606b and 607b.

Step 608

The 3GPP AAA server may check if any user location information has been received from the HSS 110 by any one of the alternatives above. If so, the 3GPP AAA server may use the network provided location information as a first priority. Otherwise the 3GPP AAA server may use the local GeoIP database to derive the Country Code information and perform the roaming restriction check based on the derived information. Note that the user profile with roaming data may need to be pre-provisioned within the 3GPP AAA Server.

Step 609

The 3GPP AAA server 113 will send back the DER response to the ePDG 117 (a response to the DER request in step 603). In case the roaming user is not allowed to access the visited network, the 3GPP AAA server may send a reject message back to the ePDG 117.

Step 610

The ePDG 117 may reply to the UE 101 with the IKEv2 Authentication response, and sets up the IPSec tunnel or rejects the tunnel setup with the UE 101.

Figure 7:
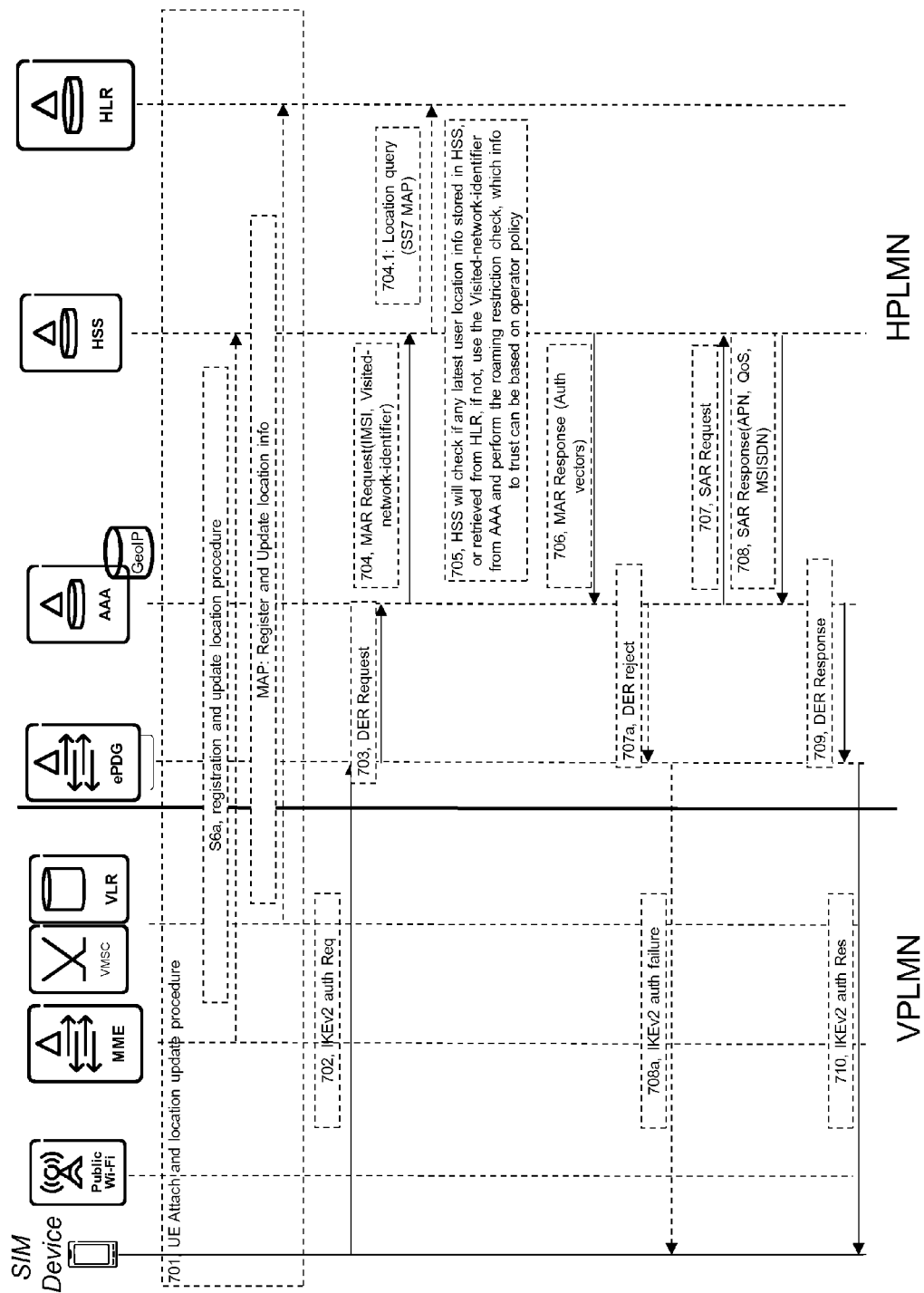
FIG. 7 is a signaling diagram illustrating embodiments of HSS based method sequence for a roaming restriction for WiFi.

FIG. 7 is a signaling diagram illustrating embodiments of a HSS 110 based method sequence. The solid vertical line in FIG. 7 illustrates the border between the VPLMN 100v and the HPLMN 100h. In FIG. 7, the UE 101 visits a visited PLMN. The method in FIG. 7 comprises at least some of the following steps, which steps may be performed in any suitable order than described below:

Step 701

This step corresponds to step 602 in FIG. 6. The user switches on the UE 101 and may initiate the attach procedure, and location update procedure towards the HLR 130 and the HSS 110 in the home network. This may involve the MME in the VPLMN 100v performing an S6a-registration and update location procedure towards the HSS 110 in the HPLMN 100h and the VMSC/VLR in the VPLMN 100v sending MAP-register and update location information to the HLR 130 in the HPLMN 100h.

Step 702

This step corresponds to step 602 in FIG. 6. The user turns on the VoWiFi service in the UE 101, and then the UE 101 may start Internet Key Exchange version 2 (IKEv2) negotiation with the ePDG 117 in the HPLMN 100h to setup an IPSec tunnel between the UE 101 and the ePDG 117 node. The IKEv2 negotiation involves the UE 101 sending an IKEv2 authorization request to the ePDG 117 in the HPLMN 100h. IKE is a protocol used to set up a security association (SA) in the IPsec protocol suite.

Step 703

This step corresponds to step 603 in FIG. 6. The ePDG 117 in the HPLMN 100h may send a Diameter Extensible authentication protocol Request (DER) to 3GPP AAA server 113 in the HPLMN 100h for user authentication and authorization over the SWm interface. The DER request comprises the UE IPSec outer IP Address. The UE IPSec outer IP address may be placed in a UE-Local-IP-Address attribute in the DER request.

Step 704

The 3GPP AAA server sends a MAR request message to the HSS 110 to request authentication information (e.g. authentication information in the form of vectors). The MAR Request message comprises the Visited-network-identifier attribute. The visited network identifier attribute may be composed of the MCC and MNC. The MNC may be a pre-defined value e.g. for public WiFi. The MCC may be derived from the GeoIP Database by mapping with the UE IP Address sent by ePDG 117. Note the abbreviations MCC and CC are used interchangeably in this document and they both refer to the (Mobile) Country Code which is an identity which is used to uniquely identify a mobile phone operator. The MNC is short for Mobile Network Code and may be used together with the (M)CC to identify the mobile phone operator.

Step 704.1

The HSS 110 may query the 2G/3G user location information from the HLR 130 in some use cases. This may be done by that the HSS 110 sends a location query e.g. using the SS7 MAP, to the HLR 130. This step 704.1 may take place e.g. if the MAR request message did not comprise the visited network identifier.

Step 705

The HSS 110 may check, if any, available user location information is stored in the HSS 110, or if the user location information has been retrieved from the HLR 130. When there is no 3GPP available information or if the available information is obsolete, the HSS 110 may use the Visited-network-identifier from 3GPP AAA server (the one received in step 704) and performs the roaming restriction check based on the visited network identifier. The information to be trusted to be used in the roaming restriction check may be based on operator policy.

Step 706

The HSS 110 server replies back to the 3GPP AAA server with a MAR response message comprising authentication vectors. The MAR response message may indicate either success along with the concerned subscription data or it may indicate that roaming is not allowed.

Step 707a

When roaming is not allowed, the 3GPP AAA server sends a reject and authentication failure the ePDG 117 in the HPLMN 100h.

Step 708a

When roaming is not allowed, the ePDG 117 sends an IKEv2 auth failure message to the UE 101.

Step 707-710

When roaming is allowed and the user is successfully authenticated by the 3GPP AAA server, normal UE registration is performed between the 3GPP AAA server and the HSS 110. Once the registration is done, the 3GPP AAA server replies with a success response message and the IPsec tunnel between the UE and the ePDG 117 is setup.

Figure 8:
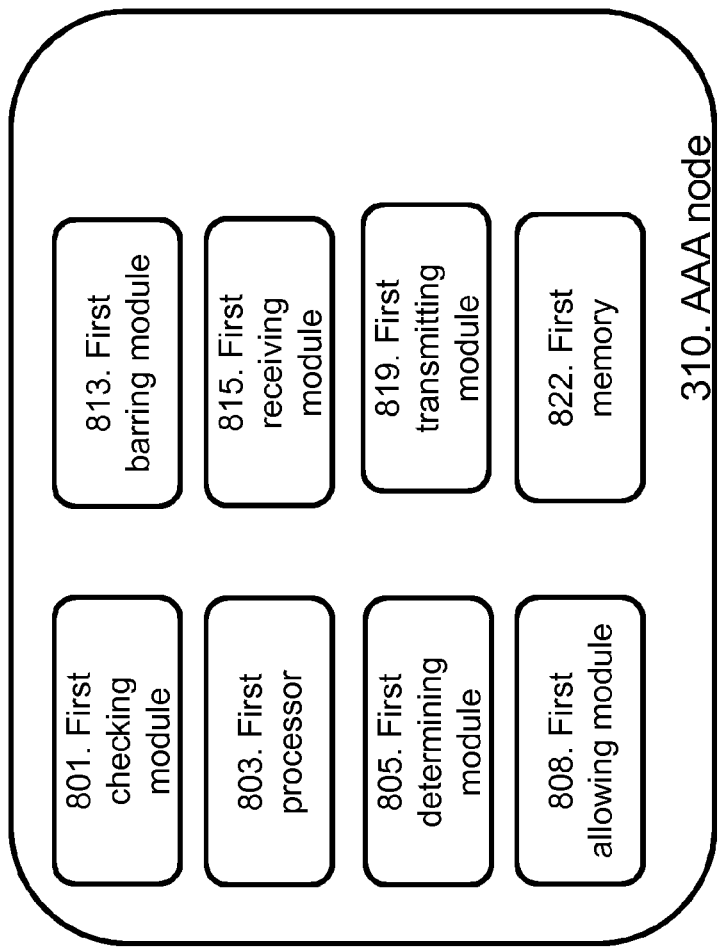
FIG. 8 is a schematic block diagram illustrating embodiment of a 3GPP node.

To perform at least some of the method steps shown in FIGS. 4, 5, 6, 7 and 8 for handling a UE 101 which requests access to a service via an untrusted non-3GPP network 103 the AAA node 310 may comprise an arrangement as shown in FIG. 8.

The AAA node 310 may be adapted to, e.g. by means of a first checking module 801, check if trusted 3GPP network location information associated with the UE 101 is available to the 3GPP node 310, 110, 113 from a subscriber database 313, 110, 115 or if the available trusted 3GPP network location information is obsolete. The first checking module 801 may be a first processor 803 of the AAA node 310.

The AAA node 310 may be adapted to, e.g. by means of a first determining module 805, if the trusted 3GPP network location information is unavailable or obsolete, determine to use untrusted non-3GPP network location information previously received from the 3GPP AAA server 113 or to derive the untrusted non-3GPP network location information at the 3GPP node. The first determining module 805 may be the first processor 803 of the AAA node 310.

The AAA node 310 may be adapted to, e.g. by means of the first determining module 805, based on the received or derived untrusted non-3GPP network location information, determining if the UE 101 is allowed or barred to access the service via the untrusted non-3GPP network.

The AAA node 310 may be adapted to, e.g. by means of a first allowing module 808 or a first barring module 813, allow or bar the UE 101 to access the service via the untrusted non-3GPP network based on the result of the determining.

In some embodiments, the 3GPP node 310 is adapted to, e.g. by means of a first receiving module 815, receive trusted 3GPP network location information from a subscriber database. The first receiving module 915 may also be referred to as a first receiving unit, a first receiving means, a first receiving circuit, first means for receiving, first input unit etc. The first receiving module 815 may be a receiver, a transceiver etc. The first receiving module 815 may be a wireless receiver of the AAA node 310 of a wireless or fixed communications system.

In some embodiments, the 3GPP node 310 is adapted to, e.g. by means of a first transmitting module 819, transmit a request for trusted 3GPP network location information. The first transmitting module 819 may also be referred to as a first transmitting unit, a first transmitting means, a first transmitting circuit, first means for transmitting, first output unit etc. The first transmitting module 819 may be a transmitter, a transceiver etc. The first transmitting module 819 may be a wireless transmitter of the AAA node 310 of a wireless or fixed communications system.

In some embodiments, the AAA node 310 comprises the first processor 903 and a first memory 822. The first memory 822 comprises instructions executable by the first processor 809.

The first memory 822 may comprise one or more memory units. The first memory 822 may be arranged to be used to store data, received data streams, power level measurements, visited 3GPP network information, subscriber information, (M)CC information, UE IP information, operator policies, roaming restrictions, threshold values, time periods, configurations, schedulings, and applications to perform the methods herein when being executed in the AAA node 310.

In some embodiments, a first computer program may comprise instructions which, when executed on at least one processor (e.g. the first processor), cause the at least one processor to carry out the method steps in FIGS. 7 and 8 performed by the 3GPP node 310. A first carrier may comprise the first computer program, and the first carrier may be one of an electronic signal, optical signal, radio signal or computer readable storage medium (e.g. the first memory).

Those skilled in the art will also appreciate that the first checking module 801, the first determining module 805, the first allowing module 808, the first barring module 813, the first receiving module 815 and the first transmitting module 818 described above may refer to a combination of analog and digital circuits, and/or one or more processors configured with software and/or firmware, e.g. stored in a memory (e.g. the first memory 822), that when executed by the one or more processors such as the first processor 803 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

As mentioned, above the AAA node 310 may be an AAA server 113 or an HSS 110.

Figure 9:
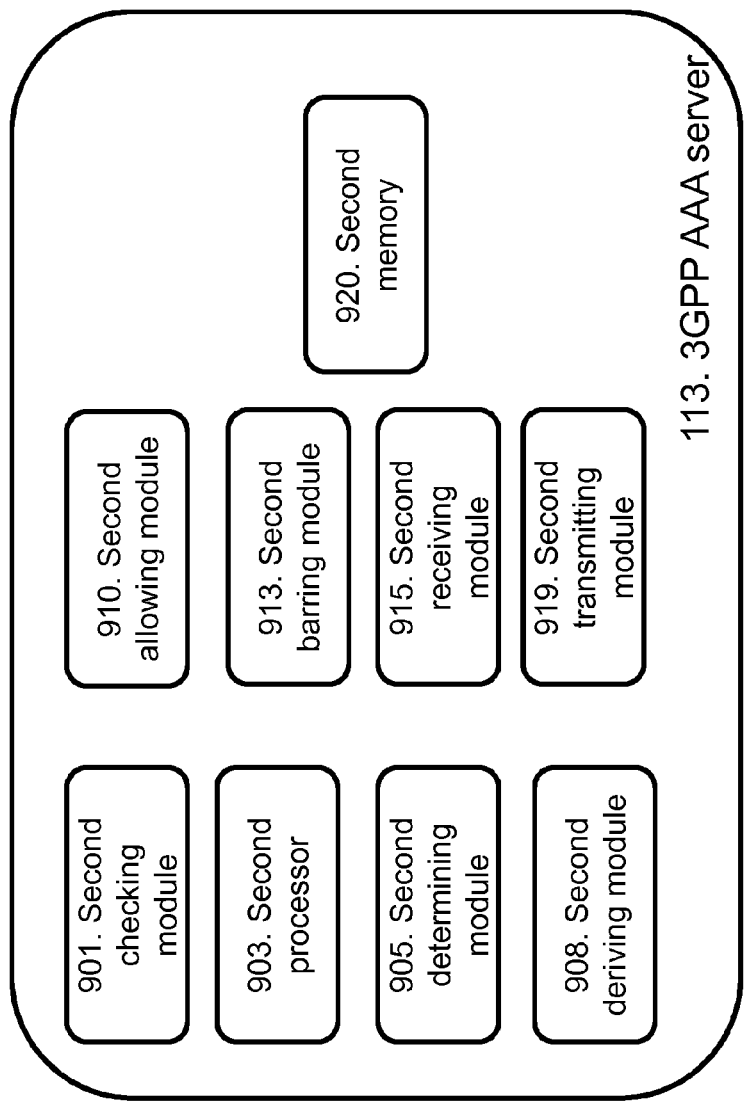
FIG. 9 is a schematic block diagram illustrating embodiments of a 3GPP AAA server.

To perform at least some of the method steps shown in FIGS. 4, 5, 6, 7 and 8 for handling a UE 101 which requests access to a service via an untrusted non-3GPP network 103 the 3GPP AAA server 113 may comprise an arrangement as shown in FIG. 9. Note that the 3GPP AAA server 113 may comprise additional elements than the ones illustrated in FIG. 9. For example, the 3GPP AAA server 113 may comprise elements such as the ones in FIG. 8.

The 3GPP AAA server 113 may be adapted to, e.g. by means of a second checking module 901, check if trusted 3GPP network location information associated with the UE 101 is available to the AAA server 113 from a subscriber database or if the available trusted 3GPP location network information is obsolete. The second checking module 901 may be a second processor 903 of the 3GPP AAA server 113.

The 3GPP AAA server 113 may be adapted to, e.g. by means of a second determining module 905, if the trusted 3GPP network location information is unavailable or obsolete, determine to derive the untrusted non-3GPP network location information at the 3GPP node. The second determining module 905 may be the second processor 905 of the 3GPP AAA server 113.

The 3GPP AAA server 113 may be adapted to, e.g. by means of a second deriving module 908, derive the untrusted non-3GPP network location information associated with the UE 101 based on information from another database. The second deriving module 908 may be the second processor 905 of the 3GPP AAA server 113.

The 3GPP AAA server 113 may be adapted to, e.g. by means of the second determining module 905, based on the derived untrusted non-3GPP network location information, determine if the UE (101) is allowed or barred to access the service via the untrusted non-3GPP network.

The 3GPP AAA server 113 may be adapted to, e.g. by means of a second allowing module 910 or a second barring module 913, allow or bar the UE 101 to access the service via the untrusted non-3GPP network based on the result of the determining.

In some embodiments, the 3GPP AAA server 113 is adapted to, e.g. by means of a second receiving module 915, receive trusted 3GPP network location information from a subscriber database. The second receiving module 915 may also be referred to as a second receiving unit, a second receiving means, a second receiving circuit, second means for receiving, second input unit etc. The second receiving module 915 may be a receiver, a transceiver etc. The second receiving module 915 may be a wireless receiver of the 3GPP AAA server 113 of a wireless or fixed communications system.

In some embodiments, the 3GPP AAA server 113 is adapted to, e.g. by means of a second transmitting module 919, transmit a request for trusted 3GPP network location information. The second transmitting module 919 may also be referred to as a second transmitting unit, a second transmitting means, a second transmitting circuit, second means for transmitting, second output unit etc. The second transmitting module 919 may be a transmitter, a transceiver etc. The second transmitting module 919 may be a wireless transmitter of the 3GPP AAA server 113 of a wireless or fixed communications system.

In some embodiments, the 3GPP AAA server 113 comprises the second processor 903 and a second memory 920. The second memory 920 comprises instructions executable by the second processor 903.

The second memory 920 may comprise one or more memory units. The second memory 920 may be arranged to be used to store data, received data streams, power level measurements, visited 3GPP network information, subscriber information, (M)CC information, UE IP information, operator policies, roaming restrictions, threshold values, time periods, configurations, schedulings, and applications to perform the methods herein when being executed in the 3GPP AAA server 113.

In some embodiments, a second computer program may comprise instructions which, when executed on at least one processor (e.g. the second processor), cause the at least one processor to carry out the method steps in FIGS. 7 and 8 performed by the 3GPP AAA server 113. A second carrier may comprise the second computer program, and the second carrier may be one of an electronic signal, optical signal, radio signal or computer readable storage medium (e.g. the second memory).

Those skilled in the art will also appreciate that the second checking module 901, the second determining module 905, the second deriving module 908, the second allowing module 910, the second barring module 913, the second receiving module 915 and the second transmitting module 919 described above may refer to a combination of analog and digital circuits, and/or one or more processors configured with software and/or firmware, e.g. stored in a memory (e.g. the second memory 920), that when executed by the one or more processors such as the second processor 903 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 10:
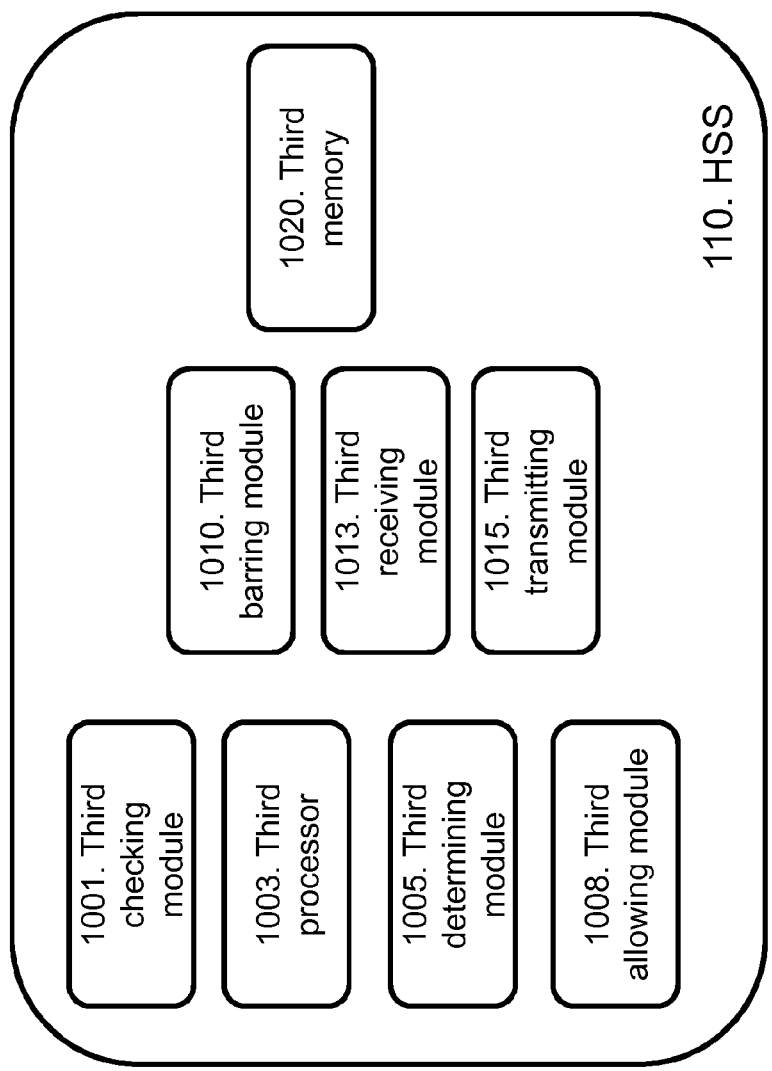
FIG. 10 is a schematic block diagram illustrating embodiments of a HSS.

To perform the method steps shown in FIGS. 7 and 8 for handling a UE 101 which requests access to a service via an untrusted non-3GPP network 103, the HSS 110 may comprise an arrangement as shown in FIG. 10.

The HSS 110 may be adapted to, e.g. by means of a third checking module 1001, check if trusted 3GPP network location information associated with the UE 101 is available to the HSS 110 or if the available trusted 3GPP network location information is obsolete. The third checking module 1001 may be a third processor 1003 of the HSS 110.

The HSS 110 may be adapted to, e.g. by means of a third determining module 1005, if the trusted 3GPP network location information is unavailable or obsolete, determine to use untrusted non-3GPP network location information previously received from the 3GPP AAA server 113. The third determining module 1005 may be the third processor 1003 of the HSS 110.

The HSS 110 may be adapted to, e.g. by means of third determining module 1005, based on the received untrusted non-3GPP network location information, determine if the UE 101 is allowed or barred to access the service via the untrusted non-3GPP network.

The HSS 110 may be adapted to, e.g. by means of a third allowing module 1008 or a third barring module 1010, allow or bar the UE 101 to access the service via the untrusted non-3GPP network based on the result of the determining. The third allowing module 1008 may be the processor 1003 of the HSS 110. The third barring module 101 may be the processor 1003 of the HSS 110.

In some embodiments, the HSS 110 is adapted to, e.g. by means of a third receiving module 1013, receive trusted 3GPP network location information from a subscriber database. The third receiving module 1013 may also be referred to as a third receiving unit, a third receiving means, a third receiving circuit, third means for receiving, third input unit etc. The third receiving module 1013 may be a receiver, a transceiver etc. The third receiving module 1013 may be a wireless receiver of the HSS 110 of a wireless or fixed communications system.

In some embodiments, the HSS 110 is adapted to, e.g. by means of a third transmitting module 1015, transmit a request for trusted 3GPP network location information.

The third transmitting module 1015 may also be referred to as a third transmitting unit, a third transmitting means, a third transmitting circuit, third means for transmitting, third output unit etc. The third transmitting module 1015 may be a transmitter, a transceiver etc. The third transmitting module 1015 may be a wireless transmitter of the HSS 110 of a wireless or fixed communications system.

In some embodiments, the HSS 1110 comprises the third processor 1003 and a third memory 1020. The third memory 1020 comprises instructions executable by the third processor 1003.

The third memory 1020 may comprise one or more memory units. The third memory 1020 may be arranged to be used to store data, received data streams, power level measurements, visited 3GPP network information, subscriber information, (M)CC information, UE IP information, operator policies, roaming restrictions, threshold values, time periods, configurations, schedulings, and applications to perform the methods herein when being executed in the HSS 110.

In some embodiments, a third computer program may comprise instructions which, when executed on at least one processor (e.g. the third processor), cause the at least one processor to carry out the method steps in FIGS. 7 and 8 performed by the HSS 110. A third carrier may comprise the third computer program, and the third carrier may be one of an electronic signal, optical signal, radio signal or computer readable storage medium (e.g. the third memory).

Those skilled in the art will also appreciate that the third checking module 1001, the third determining module 1005, the third allowing module 1008, the third barring module 1010, the third receiving module 1013 and the third transmitting module 1015 described above may refer to a combination of analog and digital circuits, and/or one or more processors configured with software and/or firmware, e.g. stored in a memory (e.g. the third memory 1020), that when executed by the one or more processors such as the third processor 1003 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The present mechanism for handling a UE 101 which requests access to a service via an untrusted non-3GPP network 103 may be implemented through one or more processors, such as a first processor 803 in the 3GPP node arrangement depicted in FIG. 8, a second processor 903 in the 3GPP AAA server arrangement depicted in FIG. 9 and a third processor 1003 in the HSS arrangement depicted in FIG. 10, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into at least one of the 3GPP node 301, the 3GPP AAA server 113 and the HSS 110. One such carrier may be in the form of a CD ROM disc. It is however feasible with other data carriers such as a memory stick. The computer program code can furthermore be provided as pure program code on a server and downloaded to at least one of the 3GPP node 310, the 3GPP AAA server 113 and the HSS 110.

Summarized, the embodiments herein enable the operator to know the user visited network when connected thru untrusted WiFi access. The embodiments herein also allow the operator to define the roaming restriction policy for Voice over WiFi under an untrusted WiFi access domain.

The roaming restriction for voice over WiFi can be applied based on at least one of the last known serving node address from the 3GPP network 103 (the last know serving node may be e.g. VLR, MME, SGSN), the 3GPP AAA user based visited network information, and the user IP address mapped to a Country Code using a GeoIP database.

Two different approaches are proposed for roaming restrictions enforcement, the HSS server based and the 3GPP AAA based.

The embodiments herein allow the operator to define the access authorization under roaming conditions, and help the customers restrict access to Voice over WiFi service when the user is outbound roaming.

The embodiments herein are not limited to the above described embodiments. Various alternatives, modifications and equivalents may be used. Therefore, the above embodiments should not be taken as limiting the scope of the embodiments.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It should also be emphasised that the steps of the methods defined in the appended claims may, without departing from the embodiments herein, be performed in another order than the order in which they appear.

EXAMPLE EMBODIMENTS

Figure 11:
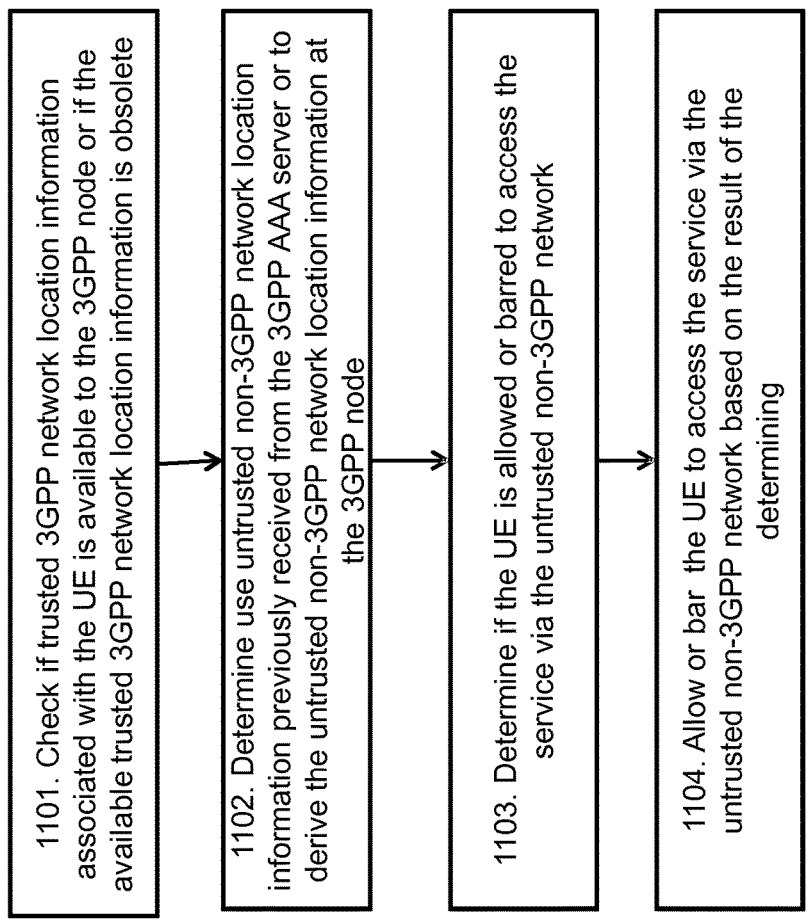
FIG. 11 is a flow chart illustrating embodiments of a method performed by a 3GPP node.

Some embodiments described herein may be summarised in the following manner:

A method performed by a 3GPP node (310, 110, 113) for handling a UE (101) which requests access to a service via an untrusted non-3GPP network (103),
the method comprising at least some of the following:
  checking (step 1101 in FIG. 11) if trusted 3GPP network location information associated with the UE (101) is available to the 3GPP node (310, 110, 113) from a subscriber database (313, 110, 115) or if the available trusted 3GPP network location information is obsolete;
  if the trusted 3GPP network location information is unavailable or obsolete, determining (step 1102 in FIG. 11) to use untrusted non-3GPP network location information previously received from the 3GPP AAA server (113) or to derive the untrusted non-3GPP network location information at the 3GPP node;
based on the received or derived untrusted non-3GPP network location information, determining (step 1103 in FIG. 11) if the UE (101) is allowed or barred to access the service via the untrusted non-3GPP network; and
allowing or barring (step 1104 in FIG. 11) the UE (101) to access the service via the untrusted non-3GPP network based on the result of the determining.

The UE (101) may be roaming into the untrusted non-3GPP network.

The untrusted non-3GPP network may be a visited untrusted non-3GPP network.

The untrusted non-3GPP network may be a WiFi network or a WiMax network or a WLAN network.

The 3GPP node (310, 110, 113) may be a 3GPP AAA server (110) or an HSS (113).

The subscriber database (313, 110, 115) may be a HSS when the 3GPP node is the 3GPP AAA server (113).

The subscriber database (313, 110, 115) may be a HLR (130) when the 3GPP node (310, 110, 113) is the HSS (113).

The service may be an EPC service such as e.g. voice over WiFi, data, IP traffic etc.

The trusted 3GPP network location information may be an address of a serving node which serves the UE (101) in a 3GPP network.

The untrusted non-3GPP network location information may be the UE's IP address.

The untrusted non-3GPP network location may be referred to as user location information.

The untrusted non-3GPP network location information previously received from the 3GPP AAA server (113) is received by the 3GPP AAA server (113) from the UE (101).

The 3GPP node may further use the received or derived untrusted non-3GPP network location information for charging purposes.

The untrusted non-3GPP network location information may be referred to as UE received non-3GPP network location information.

The decision to use untrusted non-3GPP network location information previously received from the 3GPP AAA server (113) or to derive the untrusted non-3GPP network location information at the 3GPP node may be further based on the UE type.

The user location information may be used for differentiating the charging when the user is roaming with the UE (101) outside the HPLMN.

If the UE (101) is allowed to do roaming, the user location information, received from the visited 3GPP network or derived from the untrusted non-3GPP network, may be stored at the subscriber database and expose to user data consumers when required to apply, for instance, differentiated charging.

Figure 12:
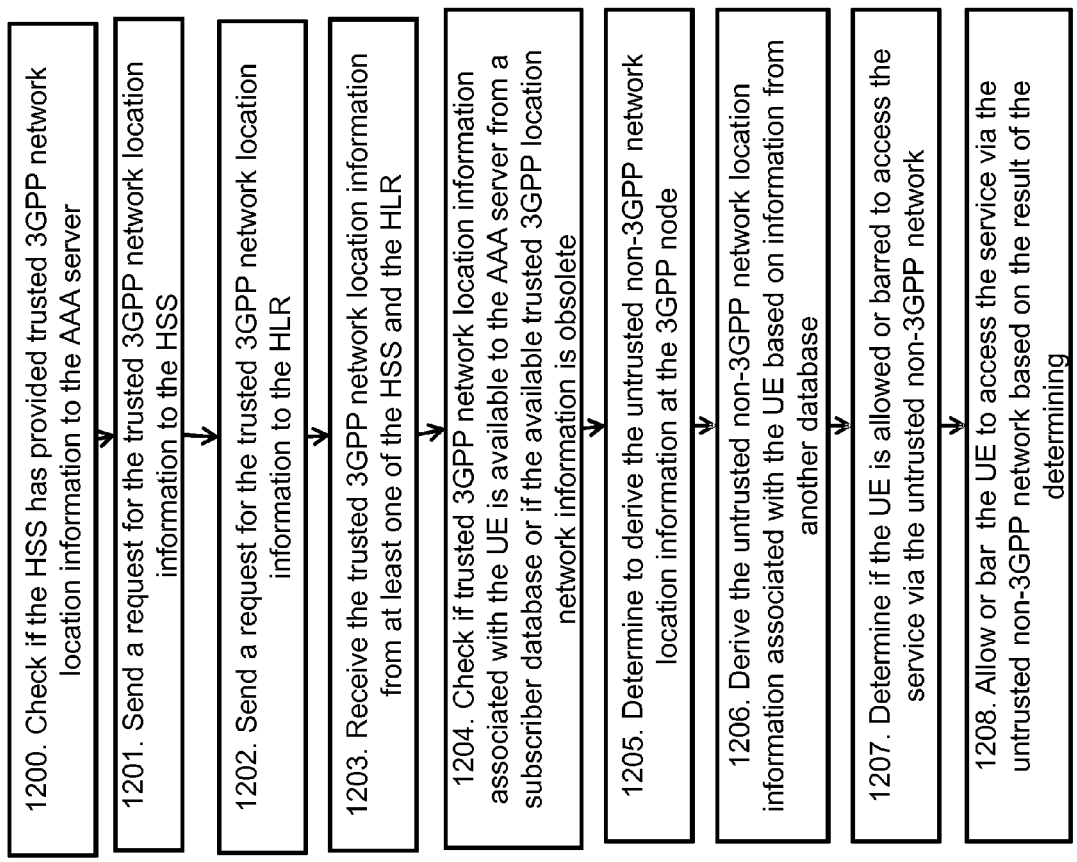
FIG. 12 is a flow chart illustrating embodiments of a method performed by a 3GPP AAA server.

A method performed by an AAA server (113) for handling a UE (101) requests access to a service via an untrusted non-3GPP network (103), the method comprising at least some of the following:
  checking (step 1204 in FIG. 12) if trusted 3GPP network location information associated with the UE (101) is available to the AAA server (113) from a subscriber database or if the available trusted 3GPP location network information is obsolete;
  if the trusted 3GPP network location information is unavailable or obsolete, determining (step 1205 in FIG. 12) to derive the untrusted non-3GPP network location information at the 3GPP node;
deriving (step 1206 in FIG. 12) the untrusted non-3GPP network location information associated with the UE (101) based on information from another database;
based on the derived untrusted non-3GPP network location information, determining (step 1207 in FIG. 12) if the UE (101) is allowed or barred to access the service via the untrusted non-3GPP network; and allowing or barring (step 1208 in FIG. 12) the UE (101) to access the service via the untrusted non-3GPP network based on the result of the determining.

The untrusted non-3GPP network location information may be derived by the AAA server (113) by mapping the UE IP address to a geographical area identifier via the other database.

The geographical area identifier may be a country code.

The other database may be a geographical database (e.g. GeoIP database) which may be associated with the AAA server.

If the trusted 3GPP network location information is available and not obsolete, performing the roaming restriction based on the available and not obsolete information.

The method may further comprise:
  checking (step 1200 in FIG. 12) if the HSS (110) has provided trusted 3GPP network location information to the AAA server (113).

The method may further comprise:
sending (step 1201 in FIG. 12) a request for the trusted 3GPP network location information to the HSS (110) if the HSS (110) has not provided the trusted 3GPP network location information to the AAA server (113); or
  sending (step 1202 in FIG. 12) a request for the trusted 3GPP network location information to the HLR (115) if the HSS (110) has not provided the trusted 3GPP network location information to the AAA server (113).

The request for visited 3GPP network information may be sent via the Sh interface to the HSS (110) and via the MAP ATI interface or the MAP SRI interface to the HLR (115).

The method may further comprise:
  receiving (step 1203 in FIG. 12) the trusted 3GPP network location information from at least one of the HSS (110) and the HLR.

The trusted 3GPP network location information may be received via the SWx interface.

The UE profile comprising roaming information may be pre-provisioned to the AAA server and used when performing the roaming restriction check.

The trusted 3GPP network location information comprises an address of a serving node (e.g. VLR, SGSN, MME in the visited 3GPP network) which serves the UE (101) in the visited 3GPP network (108).

The trusted 3GPP network location information may comprise geographical area information (e.g. country code).

The non-3GPP service may be voice over WiFi.

The untrusted non-3GPP access network (103) is an untrusted WiFi access network.

The visited network (108) may be a Visited PLMN, VPLMN.

Figure 13:
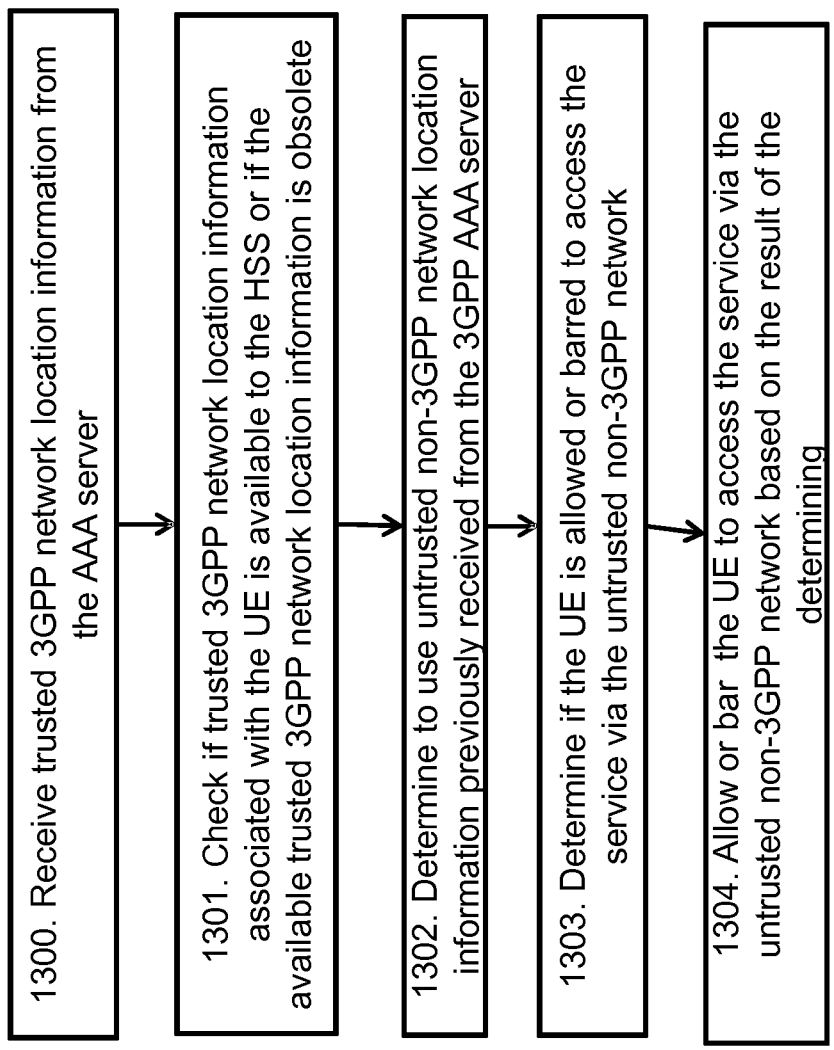
FIG. 13 is a flow chart illustrating embodiments of a method performed by a HSS.

A method performed by a HSS (110) for handling a UE (101) which requests access to a service via an untrusted non-3GPP network (103), the method comprising at least some of the following:
  checking (step 1301 in FIG. 13) if trusted 3GPP network location information associated with the UE (101) is available to the HSS (110) or if the available trusted 3GPP network location information is obsolete;
  if the trusted 3GPP network location information is unavailable or obsolete, determining (step 1302 in FIG. 13) to use untrusted non-3GPP network location information previously received from the 3GPP AAA server (113);
based on the received untrusted non-3GPP network location information, determining (step 1303 in FIG. 13) if the UE (101) is allowed or barred to access the service via the untrusted non-3GPP network; and allowing or barring (step 1304 in FIG. 13) the UE (101) to access the service via the untrusted non-3GPP network based on the result of the determining.

The method may further comprise:
receiving (step 1300 in FIG. 13) trusted 3GPP network location information from the AAA server (113).

The trusted 3GPP network location information may be received from the AAA server (113) via the SWx interface.

ABBREVIATIONS

3GPP 3rd Generation Partnership Project
MAP Mobile Application Part
ATI Anytime interrogation
SRI Send Routing Information
AAA Access, Authorization, and Accounting
EPC Evolved Packet Core
EPS Evolved Packet System
CS Circuit Switched
PS Packet Switched
SSID Service Set Identifier (ID)
HESSID Homogenous Extended Service Set Identifier (ID)
ePDG Evolved Packet Data Gateway
GW Gateway
HSS Home Subscriber Server
PLMN Public land mobile network
HPLMN Home Public land mobile network
VPLMN Visited Public land mobile network,
HLR Home Location Register
VLR Visitor location Register
IP Internet Protocol
LTE Long Term Evolution
MME Mobility Management Entity
SGSN Serving GPRS Support Node
UE User Equipment
WLAN Wireless Local Area Network
IP Internet Protocol
NW Network
PCRF Policy and Charging Rules Function
QoS Quality of Service
RAT Radio Access Technology
SGW Serving GW
WCDMA Wideband Code Division Multiple Access (CDMA) network,
VMSC Wideband CDMA Mobile Switching Centre
GSM Global System for Mobile Communications

The invention claimed is:

1. A method performed by a 3rd Generation Partnership Project (3GPP) infrastructure node for handling a user equipment (UE) requesting access to a service via an untrusted non-3GPP network, the method comprising
checking if trusted 3GPP network location information associated with the UE is available to the 3GPP infrastructure node from a subscriber database, or if the available trusted 3GPP network location information is obsolete;
determining to use untrusted non-3GPP network location information previously received from the 3GPP AAA server or to derive the untrusted non-3GPP network location information at the 3GPP infrastructure node, if the trusted 3GPP network location information is unavailable or obsolete; and
determining if the UE is allowed or barred to access the service via the untrusted non-3GPP network, based on the received or derived untrusted non-3GPP network location information.

2. The method of claim 1, further comprising
allowing or barring the UE to access the service via the untrusted non-3GPP network based on the result of the determining.

3. The method of claim 2, wherein the user location information, received from the visited 3GPP network or derived from the untrusted non-3GPP network when the UE is allowed to roam, is stored at the subscriber database and exposed to user data consumers when required to apply, for instance, differentiated charging.

4. The method of claim 1, wherein the UE is roaming into the untrusted non-3GPP network.

5. The method of claim 1, wherein the untrusted non-3GPP network is a visited untrusted non-3GPP network.

6. The method of claim 1, wherein the untrusted non-3GPP network is a Wireless Local Area Network.

7. The method of claim 1, wherein the 3GPP infrastructure node is a 3GPP Access, Authorization, and Accounting (AAA) server or an Home Subscriber Server (HSS).

8. The method of claim 7, wherein the subscriber database is a HSS and the 3GPP infrastructure node is the 3GPP AAA server.

9. The method of claim 8, wherein the subscriber database is a Home Location Register (HLR) and the 3GPP infrastructure node is the HSS.

10. The method of claim 1, wherein the service is an Evolved Packet Core service.

11. The method of claim 1, wherein the trusted 3GPP network location information is an address of a serving node which serves the UE in a 3GPP network.

12. The method of claim 1, wherein the untrusted non-3GPP network location information is the UE's IP address.

13. The method of claim 1, wherein the untrusted non-3GPP network location information is user location information.

14. The method of claim 1, wherein the untrusted non-3GPP network location information previously received from the 3GPP AAA server is received by the 3GPP AAA server from the UE.

15. The method of claim 1, wherein the 3GPP infrastructure node further uses the received or derived untrusted non-3GPP network location information for charging purposes.

16. The method of claim 1, wherein the untrusted non-3GPP network location information is UE received non-3GPP network location information.

17. The method of claim 1, wherein the decision to use untrusted non-3GPP network location information previously received from the 3GPP AAA server or to derive the untrusted non-3GPP network location information at the 3GPP infrastructure node is further based on the UE type.

18. The method of claim 1, wherein the user location information is used for differentiating the charging when the user is roaming with the UE outside the Home Public Land mobile Network.

19. A 3GPP infrastructure node comprising:
a memory; and
processing circuitry coupled to the memory, wherein the 3GPP infrastructure node is configured to:
check if trusted 3GPP network location information associated with the UE is available to the 3GPP infrastructure node from a subscriber database, or if the available trusted 3GPP network location information is obsolete;
determine to use untrusted non-3GPP network location information previously received from the 3GPP AAA server or to derive the untrusted non-3GPP network location information at the 3GPP infrastructure node, if the trusted 3GPP network location information is unavailable or obsolete; and determine if the UE is allowed or barred to access the service via the untrusted non-3GPP network, based on the received or derived untrusted non-3GPP network location information.

20. A method performed by an Access, Authorization, and Accounting (AAA) server for handling a user equipment (UE) requesting access to a service via an untrusted non-3GPP network, the method comprising checking if trusted 3GPP network location information associated with the UE is available to the AAA server from a subscriber database or if the available trusted 3GPP location network information is obsolete;

determining to derive the untrusted non-3GPP network location information at the 3GPP infrastructure node, if the trusted 3GPP network location information is unavailable or obsolete;

deriving the untrusted non-3GPP network location information associated with the UE based on information from another database; and determining if the UE is allowed or barred to access the service via the untrusted non-3GPP network, based on the derived untrusted non-3GPP network location information.

21. The method of claim 20, further comprising
allowing or barring the UE to access the service via the untrusted non-3GPP network based on the result of the determining.

22. The method of claim 20, wherein the untrusted non-3GPP network location information is derived by the AAA server by mapping the UE IP address to a geographical area identifier via the other database.

23. The method of claim 22, wherein the geographical area identifier is a country code.

24. The method of claim 23, wherein the other database is a geographical database which is associated with the AAA server.

25. The method of claim 20, wherein the performing the roaming restriction is based on the available and not obsolete information, if trusted 3GPP network location information is available and not obsolete.

26. The method of claim 20, further comprising
checking if the HSS has provided trusted 3GPP network location information to the AAA server.

27. The method of claim 20, further comprising
sending (step 1201 in FIG. 12) a request for the trusted 3GPP network location information to the HSS if the HSS has not provided the trusted 3GPP network location information to the AAA server; or sending a request for the trusted 3GPP network location information to the HLR, if the HSS has not provided the trusted 3GPP network location information to the AAA server.

28. The method of claim 27, wherein the trusted 3GPP network location information is received via the SWx interface.

29. The method of claim 20, wherein the request for visited 3GPP network information is sent via the Sh interface to the HSS and via the MAP ATI interface or the MAP SRI interface to the HLR.

30. The method of claim 20, further comprising
receiving (step 1203 in FIG. 12) the trusted 3GPP network location information from at least one of the HSS and the HLR.

31. The method of claim 20, wherein the UE profile comprises roaming information is pre-provisioned to the AAA server and used when performing the roaming restriction check.

32. The method of claim 20, wherein the trusted 3GPP network location information comprises an address of a serving node which serves the UE in the visited 3GPP network.

33. The method of claim 20, wherein the trusted 3GPP network location information comprises geographical area information.

34. The method of claim 20, wherein the non-3GPP service is voice over WiFi.

35. The method of claim 20, wherein the untrusted non-3GPP access network is an untrusted WiFi access network.

36. The method of claim 20, wherein the visited network is a Visited Public Land mobile Network, VPLMN.

37. An Access, Authorization, and Accounting (AAA) server comprising:
a memory; and
processing circuitry coupled to the memory, wherein the AAA server is configured to:
check if trusted 3GPP network location information associated with the UE is available to the AAA server from a subscriber database or if the available trusted 3GPP location network information is obsolete;
determine to derive the untrusted non-3GPP network location information at the 3GPP infrastructure node, if the trusted 3GPP network location information is unavailable or obsolete;
derive the untrusted non-3GPP network location information associated with the UE based on information from another database; and
determine if the UE is allowed or barred to access the service via the untrusted non-3GPP network, based on the derived untrusted non-3GPP network location information.

38. A method performed by a Home Subscriber Server (HSS) for handling a user equipment (UE) requesting access to a service via an untrusted non-3GPP network, the method comprising
checking if trusted 3GPP network location information associated with the UE is available to the HSS or if the available trusted 3GPP network location information is obsolete;
determining to use untrusted non-3GPP network location information previously received from the 3GPP AAA server, if the trusted 3GPP network location information is unavailable or obsolete; and
determining if the UE is allowed or barred to access the service via the untrusted non-3GPP network, based on the received untrusted non-3GPP network location information.

39. The method of claim 38, further comprising
allowing or barring the UE to access the service via the untrusted non-3GPP network based on the result of the determining.

40. The method of claim 38, wherein the method further comprises
receiving trusted 3GPP network location information from the AAA server.

41. The method of claim 38, wherein the trusted 3GPP network location information is received from the AAA server via the SWx interface.

42. A Home Subscriber Server (HSS) comprising:
a memory; and
processing circuitry coupled to the memory, wherein the HSS is configured to:
check if trusted 3GPP network location information associated with the UE is available to the HSS or if the available trusted 3GPP network location information is obsolete;
determine to use untrusted non-3GPP network location information previously received from the 3GPP AAA server, if the trusted 3GPP network location information is unavailable or obsolete; and
determine if the UE is allowed or barred to access the service via the untrusted non-3GPP network, based on the received untrusted non-3GPP network location information.

* * * * *